United States Patent [19]
Bridgelall et al.

[11] Patent Number: 5,525,788
[45] Date of Patent: Jun. 11, 1996

[54] SYSTEM FOR SCANNING BAR CODE SYMBOLS ON MOVING ARTICLES USING A CAMERA AND SCANNER

[75] Inventors: Raj Bridgelall, East Setauket; Joseph Katz, Stony Brook, both of N.Y.

[73] Assignee: Symbol Technologies Inc., Holtsville, N.Y.

[21] Appl. No.: 468,619

[22] Filed: Jun. 6, 1995

Related U.S. Application Data

[60] Continuation of Ser. No. 271,660, Jul. 7, 1994, abandoned, which is a division of Ser. No. 981,448, Nov. 25, 1992, which is a continuation-in-part of Ser. No. 897,835, Jun. 12, 1992, abandoned, which is a continuation-in-part of Ser. No. 506,674, Apr. 9, 1990, abandoned, which is a continuation of Ser. No. 260,692, Oct. 21, 1988, Pat. No. 4,933,538.

[51] Int. Cl.$^6$ ............................................. G06K 7/10
[52] U.S. Cl. ................................. 235/462; 235/470
[58] Field of Search ................................. 235/462, 470, 235/471

[56] References Cited

U.S. PATENT DOCUMENTS

| 3,728,677 | 4/1973 | Munson ........................ 235/470 |
| 3,774,014 | 11/1973 | Berler ......................... 235/471 |
| 3,847,346 | 11/1974 | Dolch . | |
| 4,064,390 | 12/1977 | Hildebrand et al. ............. 235/467 |
| 4,360,798 | 11/1982 | Swartz et al. . | |
| 4,387,297 | 6/1983 | Swartz et al. . | |
| 4,418,276 | 11/1983 | Yatsunami . | |
| 4,760,248 | 7/1988 | Swartz et al. . | |
| 4,792,666 | 12/1988 | Cherry et al. . | |
| 4,800,256 | 1/1989 | Broockman et al. . | |
| 4,933,538 | 6/1990 | Heiman et al. . | |
| 5,115,121 | 5/1992 | Bianco et al. . | |
| 5,132,523 | 7/1992 | Bassett . | |
| 5,151,581 | 9/1992 | Krichever et al. . | |
| 5,235,167 | 8/1993 | Dvorkis et al. . | |

FOREIGN PATENT DOCUMENTS

| 62-237756 | 10/1987 | Japan ........................ 235/462 |
| 3-271987 | 12/1991 | Japan ........................ 235/462 |

*Primary Examiner*—John Shepperd
*Attorney, Agent, or Firm*—Finnegan, Henderson, Farabow, Garrett & Dunner

[57] ABSTRACT

A system for scanning bar code symbols on articles moving at a given speed senses an article at a predetermined location and determines an orientation of a bar code symbol on the article using an imaging camera. In response to determinations of a symbol location, orientation, size or type, the scanning system adjusts a scanning speed, shape and/or orientation of the light beam pattern and a location of the light beam pattern. The resulting light beam is directed at the bar code symbol location and a signal corresponding to the reflected light beam portion is generated. If the decode is not valid, the bar code symbol is rescanned.

22 Claims, 23 Drawing Sheets

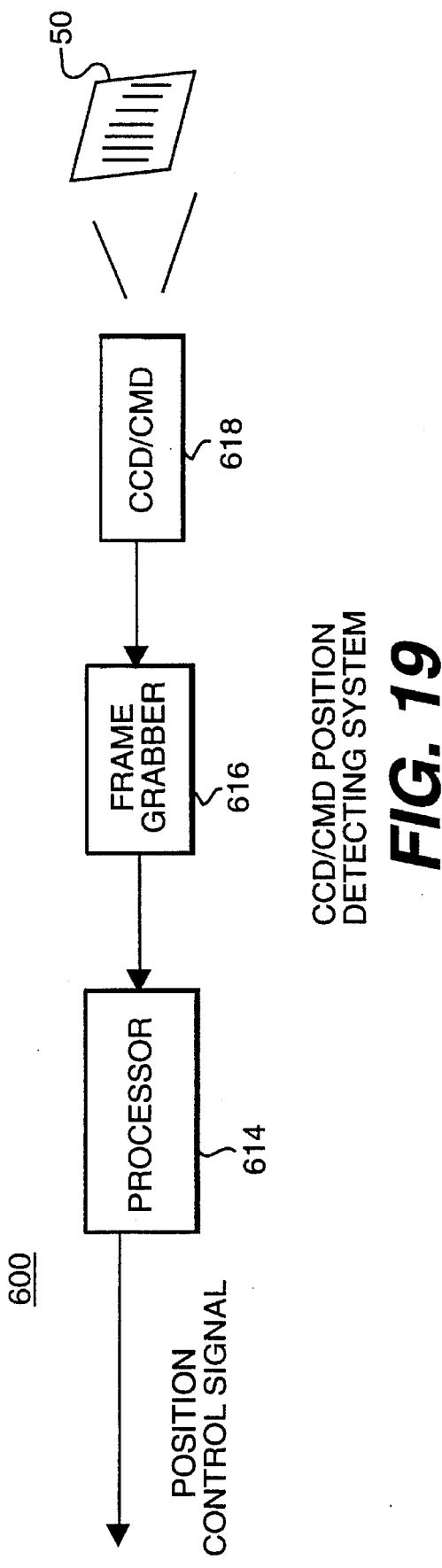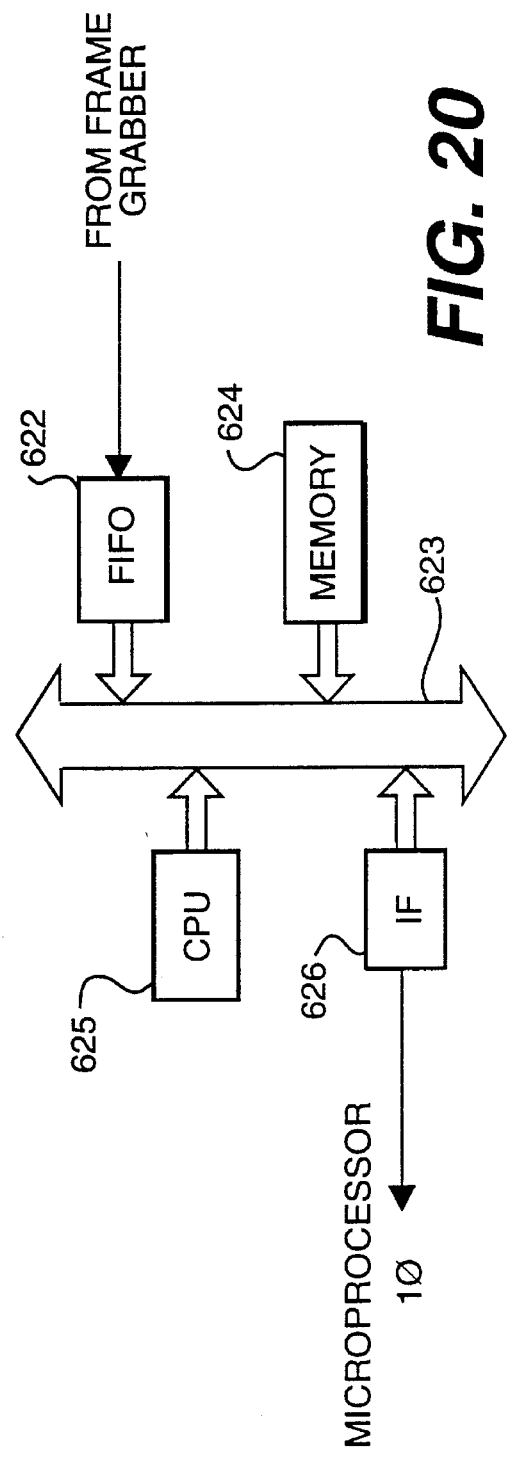

SYSTEM FOR SCANNING BAR CODE SYMBOLS ON MOVING ARTICLES USING A CAMERA AND SCANNER

REFERENCE TO RELATED APPLICATIONS

This application is a continuation of application Ser. No. 08/271,660, filed Jul. 7, 1994, now abandoned which is a divisional application of application Ser. No. 07/981,448, filed Nov. 25, 1992 which is a continuation-in-part of U.S. patent application Ser. No. 897,835, filed Jun. 12, 1992, now abandoned which is a continuation-in-part of U.S. patent application Ser. No. 506,674, filed Apr. 9, 1990, now abandoned which in turn is a continuation of Ser. No. 260,692, filed Oct. 21, 1988, now U.S. Pat. No. 4,933,538. This application is also related to U.S. patent application Ser. No. 562,130, filed Aug. 3, 1990, and U.S. patent application Ser. No. 553,559, filed Jul. 16, 1990. This application is further related to U.S. patent applications Ser. No. 790,627, filed Nov. 12, 1991, which is a divisional of said Ser. No. 562,130; Ser. No. 635,431 filed Dec. 28, 1990; and Ser. No. 715,267, filed Jun. 14, 1991, all of said applications being assigned to Symbol Technologies, Inc.

BACKGROUND OF THE INVENTION

A. Field of the Invention

The present invention relates to scanning systems which "read" indicia, for example, barcode symbols, having parts with different light reflectivities and, in particular, to control circuitry which enables such scanning systems to adaptively alter a light beam pattern in response to feedback signals.

B. Description of the Related Art

Various optical readers and optical scanning systems have previously been developed for reading barcode symbols appearing on a label, or on the surface of an article. The barcode symbol itself is a coded pattern of indicia. Generally, scanning systems electro-optically transform the graphic indicia of the symbols into electrical signals which are decoded into alphanumeric characters. The resulting characters describe the article and/or some characteristic of the article to which the symbol is attached. Such characters typically comprise input data to a data processing system for applications in point-of-sale processing, inventory control, and the like.

As used in this specification and in the following claims, the terms "symbol," "barcode," and "barcode symbol" are used to denote a pattern of variable-width bars separated by variable-width spaces. The foregoing terms are intended to be broadly construed to cover many specific forms of one- and two-dimensional patterns including alpha-numeric characters, as well as, bars and spaces.

The specific arrangement of bars or elements in a symbol defines the character represented according to a set of rules and definitions specified by the code. This is called the "symbology" of the code. The relative size of the bars and spaces is determined by the type of code used, as is the actual size of the bars and spaces. The number of characters per inch represented by the barcode symbol is referred to as the density of the symbol.

To encode a desired sequence of characters, a collection of element arrangements are concatenated together to form the complete symbol, with each character being represented by its own corresponding group of elements. In some symbologies, a unique "start" and "stop" character is used to indicate where the barcode symbol begins and ends. A number of different barcode symbologies presently exist. These symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of characters vertically instead of extending symbols bars horizontally. That is, there are several rows of bar and space patterns, instead of one long row. The structure of Code 49 is described in U.S. Pat. No. 4,794,239. Another two-dimensional code structure known as PDF417 is described in U.S. patent application Ser. No. 07/461,881 filed Jan. 5, 1990, commonly assigned to the assignee of the present invention, and hereby incorporated by reference.

Scanning systems have been disclosed, for example, in U.S. Pat. Nos. 4,251,798; 4,369,361; 4,387,297; 4,409,470; 4,760,248; 4,896,026, all of which have been assigned to the assignee of the present invention. As disclosed in some of the above patents, and particularly in U.S. Pat. No. 4,409,470, one existing scanning system comprises a hand-held, portable laser scanning head. The hand-held scanning system is configured to allow a user to manually aim a light beam emanating from the head at a target symbol.

These scanning systems generally include a light source consisting of a gas laser or semiconductor laser. The use of semiconductor devices as the light source in scanning systems is especially desirable because of their small size, low cost and low power requirements. The laser beam is optically manipulated, typically by a focusing optical assembly, to form a beam spot having a certain size at a predetermined target location. Preferably, the cross section of the beam spot at the target location approximates the minimum width between symbol regions of different light reflectivity, i.e., the bars and spaces.

In conventional scanning systems, the light beam is directed by lens or similar optical components along a light path toward a target symbol. The scanner operates by repetitively scanning the light beam in a line or a series of lines across the target symbol by movement of a scanning component such as a mirror disposed in the path of the light beam. The scanning component may sweep the beam spot across the symbol, trace a scan line across and beyond the boundaries of the symbol, and/or scan a predetermined field of view.

Scanning systems also include a sensor or photodetector which functions to detect light reflected or scattered from the symbol. The photodetector or sensor is positioned in the scanner in an optical path so that it has a field of view which extends at least across and slightly beyond the boundaries of the symbol. A portion of the light beam reflected from the symbol is detected and converted into an analog electrical signal.

The analog electrical signal produced by the photodetector is converted by a digitizer circuit in the scanner into a pulse-width modulated digital signal having widths corresponding to the physical widths of the symbol elements. Conventional digitizers include a positive edge detector which sets a "one-shot" circuit having a predetermined time constant, and a negative edge detector which resets the "one-shot" circuit. Some conventional digitizers include circuits for selecting a variable edge detection threshold in an attempt to suppress noise triggered edge detections. Other conventional digitizers incorporate multiple single digitizer circuits in a parallel arrangement to further suppress "false" edge detections caused by noise in the electrical signal. However, each of these conventional digitizer circuits suffers from an unacceptably high rate of edge "falsing" for noisy electrical signals.

The pulse-width modulated digitized signal from the digitizer is decoded, based upon the specific symbology used for the symbol, into a binary data representation of the data encoded in the symbol. The binary data may then be subsequently decoded into the alphanumeric characters represented by the symbol.

The decoding process in conventional scanning systems usually works in the following way. The decoder receives the pulse-width modulated digital signal from the scanner, and an algorithm implemented in software attempts to decode the scan. If the start and stop characters and the characters between them are successfully and completely decoded, the decoding process terminates and an indicator (such as a green light and/or an audible beep) is initiated to inform the user. Otherwise, the decoder receives a next scan, attempts another decode on the scan, and so on, until a completely decoded scan is achieved or no more scans are available.

Overall performance of a scanning system in reading symbols is a function of the optical capabilities of the scanning mechanism in directing a light beam at a target symbol and resolving the reflected light, and a function of the electronic subsystems which convert and process the information contained in the reflected light. A measure of the overall performance of a barcode symbol scanning system is its ability to resolve the narrowest elements of a barcode symbol and its ability to decode symbols located perhaps hundreds of inches away from the scanning system.

One limiting factor in the ability of conventional scanning systems to correctly resolve elements in a barcode symbol is the degree to which conventional digitizers produce false edge detections. As previously mentioned, false edge detections result from noise on the electrical signal representing the received portion of the light beam reflected from the symbol. False edge detections corrupt the pulse-width modulated signal corresponding to the symbol elements, and must be compensated for by rescanning the symbol to obtain a less noisy electrical signal or by employing some form of error detection and correction. Either compensation scheme slows signal processing in the scanning system.

Continuing attempts have been made to design and implement an improved scanning system which has very high overall performance in a wide variety of operational environments. Conventional scanning systems adjust scanning parameters, if at all, on a piecemeal basis. Such adjustments are typically made manually, and often require the intervention of a trained technician. Furthermore, conventional adjustments are made only to a single, independent scanning system parameter such as beam intensity or amplifier gain.

Conventional scanning systems also typically use a preset light beam pattern which takes the form of a repeated linear scan, a standard raster scan, or jittered raster scan. These systems suffer from the disadvantage that laser scanning systems must substantially align light beam pattern scan lines with the rows of a symbol. Although a two-dimensional barcode symbol such as PDF417 allows some deviation in this alignment, the orientation of the scan lines must still be less than a maximum angle relative to the rows of the symbol.

Very fast conventional scanning systems also require the operator to manually align the scan lines with symbol rows, typically by moving the scanning device or the article being scanned in order to improve the chances of reading the symbol. This requirement is particularly impractical where the scanned articles are large or heavy, or in applications where scanning is intended to be automated.

The light beam pattern of a conventional scanning system is usually preset according to an intended mode of scanning. For example, a hand-held scanning system will use an "optimal" handheld light beam pattern. In contrast, a fixed or presentation type scanning system will be preset to a different "optimal" light beam pattern for fixed scanning applications. Since these preset, "mode optimal" light beam patterns can not be easily changed, conventional scanning systems can not be quickly and efficiently switched between scanning modes.

Conventional scanning systems also cannot be efficiently used in applications which require scanning of two or more different symbols. For example, if an article has one-dimensional and two-dimensional symbols attached to it, conventional scanning systems cannot alternatively optimize the light beam pattern to read each symbol efficiently. A series of articles having symbols with different symbologies presents a similar problem to a scanning systems with a preset light beam pattern.

Finally, conventional scanning systems can not be used to "track," or follow a symbol on a moving object.

SUMMARY OF THE INVENTION

Accordingly, it is a goal of the present invention to provide a method and apparatus for adaptively generating a light beam pattern in accordance with one or more feedback signals.

Another goal is to provide a method and apparatus for tracking, scanning and decoding a symbol attached to a moving object. A system for scanning bar code symbols on moving articles, including a sensor for sensing the presence of an article at a predetermined location. An imaging camera records an image of the article and an image decoder examines the recorded image to determine a location of a bar code symbol on the article and outputs coordinate location signals reflecting the location of the bar code symbol. A microprocessor selects a pattern for a scanning light beam in response to the coordinate location signals. A scanner directs the scanning light beam in the selected pattern at the bar code symbol location and detects a reflected portion of the scanning light beam. A decode generates a decode signal corresponding to the reflected light beam portion. The microprocessor determines whether the decode signal represents a valid decode and initiates a rescan of the bar code symbol when the decode signal is not a valid decode.

A method of scanning bar code symbols on articles moving at a given speed, includes sensing an article at a predetermined location. A location of a bar code symbol is determined on the article using an imaging camera. Coordinate location signals are generated reflecting the location of the bar code symbol. A pattern for a scanning light beam is selected in response to the coordinate location signals. The bar code signal is scanned by directing the scanning light beam in the selected pattern at the bar code symbol location. A reflected portion of the scanning light beam is detected. A decode signal corresponding to the reflected light beam portion is generated and it is determined whether the decode signal represents a valid decode. When the decode is not valid, the bar code symbol is rescanned.

It is to be understood that both the foregoing general description and the following detailed description are exemplary and explanatory, and are not restrictive of the invention as claimed. The accompanying drawings, which are incorporated in and constitute a part of the specification, illustrate embodiments of the present invention and together with the general description, serve to explain the principles of the present invention.

BRIEF DESCRIPTION OF THE DRAWINGS

FIG. 14b is a block diagram illustrating an embodiment of a "multiplier" used in the rotator/translator shown in FIG. 14a.

FIG. 16b is a side view cut-away of the schematic block diagram illustrating the embodiment of the X/Y scanning head shown in FIG. 16a.

FIG. 19 is a block diagram illustrating an embodiment of a system for use with the scanning systems shown in FIGS. 1 and 2 which detects barcode symbol location and orientation using a CCD/CMD camera.

FIG. 20 is a schematic block diagram of an embodiment of the decoder shown in FIG. 19.

DESCRIPTION OF THE PREFERRED EMBODIMENTS

A. GENERAL DESCRIPTION

Figure 1:
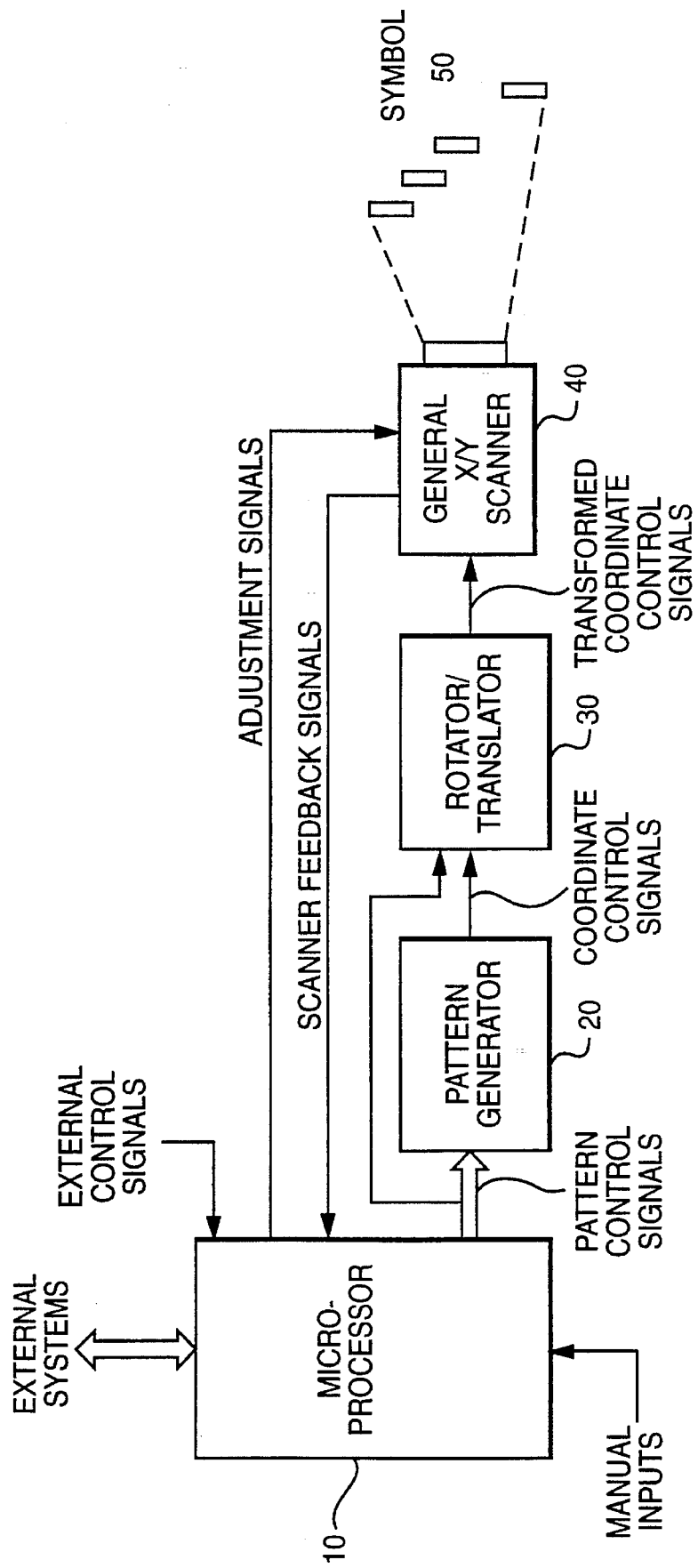
FIG. 1 is a block diagram illustrating an embodiment of a scanning system according to the present invention having an adaptive pattern generator.

An embodiment of the present invention is shown generally in FIG. 1. Symbol 50 is scanned by a light beam generated and directed by general X/Y scanner 40. Symbol 50 may be a one- or two-dimensional barcode symbol as previously described. The embodiment may reside in a hand-held, desktop workstation, or stationary scanning system as described hereafter.

Scanner 40 directs a light beam at a predetermined location, detects light reflected from symbol 50, and generates feedback signals indicative of light beam scanning efficiencies, symbol readability, position of the symbol and/or environmental conditions surrounding symbol 50. Feedback signals may include percent decode rate, lighting conditions, mode of scanning (handheld, fixed or presentation), scanning speed, beam focus (for example, a fuzzy logic approach to focusing may be taken) symbology, and symbol density, range, location and orientation. Feedback signals are applied to microprocessor 10 which controls light beam pattern generation and scanner adjustments on the basis of one or more of the feedback signals.

A program running in, or callable by, microprocessor 10 optimizes the operating parameters of scanner 40 to improve symbol scanning efficiency. Among the operating parameters capable of being optimized by microprocessor 10 are scanning beam spot size and/or working distance from the symbol 50. U.S. Pat. No. 4,808,804, commonly assigned to the assignee of the present invention and incorporated by reference herein, is directed to symbol readers with variable spot size and/or working distance. Additionally, among the operating parameters capable of being optimized by microprocessor 10 are light beam intensity and/or single plane scanning angle. U.S. Pat. No. 4,933,538, commonly assigned to the assignee of the present invention and incorporated by reference herein, is directed to scanning systems with adjustable light intensity and/or single plane scanning angle.

In addition to one or more of these operating parameters, the present invention may alter the pattern in which the light beam is generated by scanner 40 and directed at symbol 50. This control process of adaptively altering the light beam pattern in response to feedback signals supplied by scanner 40 or by an external source will be described in detail below. Generally speaking, microprocessor 10 provides pattern control signals to pattern generator 20. Manual inputs from a user interface (not shown) may also be provided to microprocessor 10, and subsequently, or simultaneously, to pattern generator 20. Similarly, external inputs from external systems, such as an interconnected data base, or control computer system, may be provided to microprocessor 10. Manual inputs or external inputs may supplant, override, or modify the pattern control signals generated by microprocessor 10.

In response to pattern control signals generated by microprocessor 10, pattern generator 20 provides a new or modified set of coordinate control signals to scanner 40. The coordinate signals, when applied to the scanner 40, control the optical assembly or scanner control logic such that the pattern of the directed light beam is altered into a new pattern or modified into a variation of the existing pattern.

As shown in FIG. 1, the coordinate control signals may be transformed by a rotator/translator 30 before being applied to scanner 40. By transforming the coordinate control signals, the new light beam pattern may be translated to a new location and/or be rotated to a new angular disposition with respect to the previous light beam pattern. In an embodiment of the present invention comprising a rotator/translator 30, microprocessor 10 provides, as a pattern control signal, a displacement signal to the rotator/translator 30. The displacement signal indicates the relative angular orientation and/or location of a light beam pattern to a previous light beam pattern. Alternatively, the displacement signal may indicate the angular orientation relative to a reference location or to a static reference point. In response to the displacement signal, the rotator/translator 30 modifies or transforms, the coordinate control signals from the pattern generator 20 in order to direct the light beam pattern more accurately at symbol 50.

Each of the foregoing elements, microprocessor 10, pattern generator 20, rotator/translator 30 and scanner 40, will be described in detail below. Each of the elements is discussed as a separate functional entity for purposes of clarity. However, one of ordinary skill in the art will recognize that two or more elements may be combined in a single circuit structure or software routine. For example, a single circuit or software routine may simultaneously perform the functions mentioned above with respect to pattern generator 20 and rotator/translator 30. Following a description of the foregoing elements, various modes of operation, and exemplary feedback signals operative upon the present invention will be described.

Embodiments of the present invention may generally be similar to the style disclosed in U.S. Pat. No. 4,760,248, or in U.S. Pat. No. 4,896,026, both assigned to the assignee of the present invention and may also be similar to a symbol scanning system commercially available as part number LS 8500 or LS 2000 from Symbol Technologies, Inc. Alternatively, or in addition, features of U.S. Pat. No. 4,387,297, or U.S. Pat. No. 4,409,470, both assigned to the assignee of the present invention, U.S. Pat. Nos. 4,760,248, 4,896,026 and 4,409,470 are incorporated herein by reference, but the general design of such devices will be briefly described below for completeness.

Figure 2:
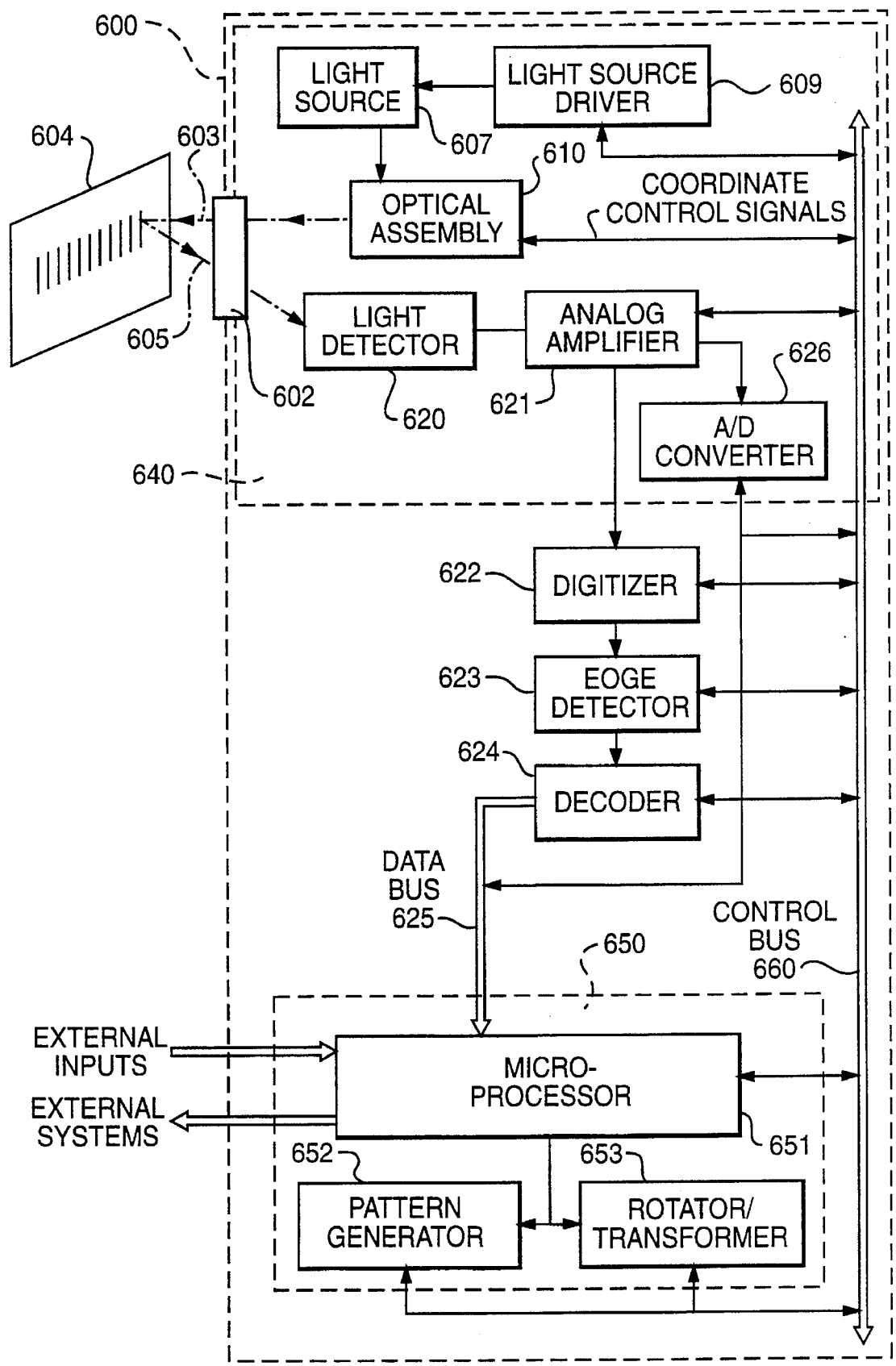
FIG. 2 is a block diagram illustrating another embodiment of the scanning system of FIG. 1.

A simplified block diagram of another embodiment of the present invention is shown in FIG. 2. In FIG. 2, scanner 640, corresponding to element 40 shown in FIG. 1, is illustrated in greater detail, as is the relationship between scanner 640 and control logic unit 650 comprising microprocessor 651, pattern generator 652, and rotator/translator 653. Scanning system 600 may be implemented as a portable (hand-held) scanning system, as a desk-top workstation or as a stationary (fixed) scanning system.

In scanner 640, outgoing light beam 603 is generated by light source 607, usually a laser diode or the like. The light beam from light source 607 is optically modified by an optical assembly 610. The optical assembly 610 may include the auto-focusing lens, and dual X/Y lens elements described hereafter, a scanning motor unit and various control/drive circuitry. Generally speaking, optical assembly 610 is responsive to coordinate control signals transferred from the control logic unit 650 via control bus 660. The outgoing light beam is typically sized and shaped by optical assembly 610 and scanned in a specific pattern. The light beam pattern may be a single line, a raster, or more complex two-dimensional pattern. Scanned beam 603 is then directed by scanning system 600 through an exit window 602 to impinge upon a code bar symbol 604 disposed at a predetermined target location.

Reflected and/or scattered light 605 from symbol 604 is detected by a light detector 620 of scanner element 640. Light detector 620 produces electrical signals to be processed and decoded in order to reproduce the data represented in barcode symbol 604. The output of light detector 620 is applied to an analog amplifier 621 having an adjustable or selectable gain and bandwidth. Amplifier control signals applied from data bus 625 effect adjustment of circuit values in analog amplifier 621. One output of analog amplifier 621 is applied to an analog-to-digital (A/D) converter 626. A/D converter 626 is connected to control bus 660 to transfer the sampled digital signal for processing by control logic unit 650.

Another output of analog amplifier 621 is applied to a digitizer 622. Digitizer 622 converts the analog signal from analog amplifier 621 into a pulse width modulated digital signal. Digitizer 622, described hereafter, utilizes variable threshold levels which, according to the present invention, can be appropriately adjusted. Digitizer control signals from control bus 660 effect the adjustment of threshold levels in digitizer 622.

The output of digitizer 622 is applied to an edge detector 623. The operation of edge detector 623 is explained in U.S. application Ser. No. 506,674 filed Apr. 9, 1990. Edge detector 623 is connected to decoder 624, which may function in the conventional manner described in the BACKGROUND OF THE INVENTION or in the manner described hereafter. The decoded data may be stored in a latch (not shown) which is connected to data bus 625, and control bus 660. Decoded data is thus presented to control logic unit 650 for further processing and also may be subsequently applied to external systems and/or an external memory.

B. THE MICROPROCESSOR

Figure 3:
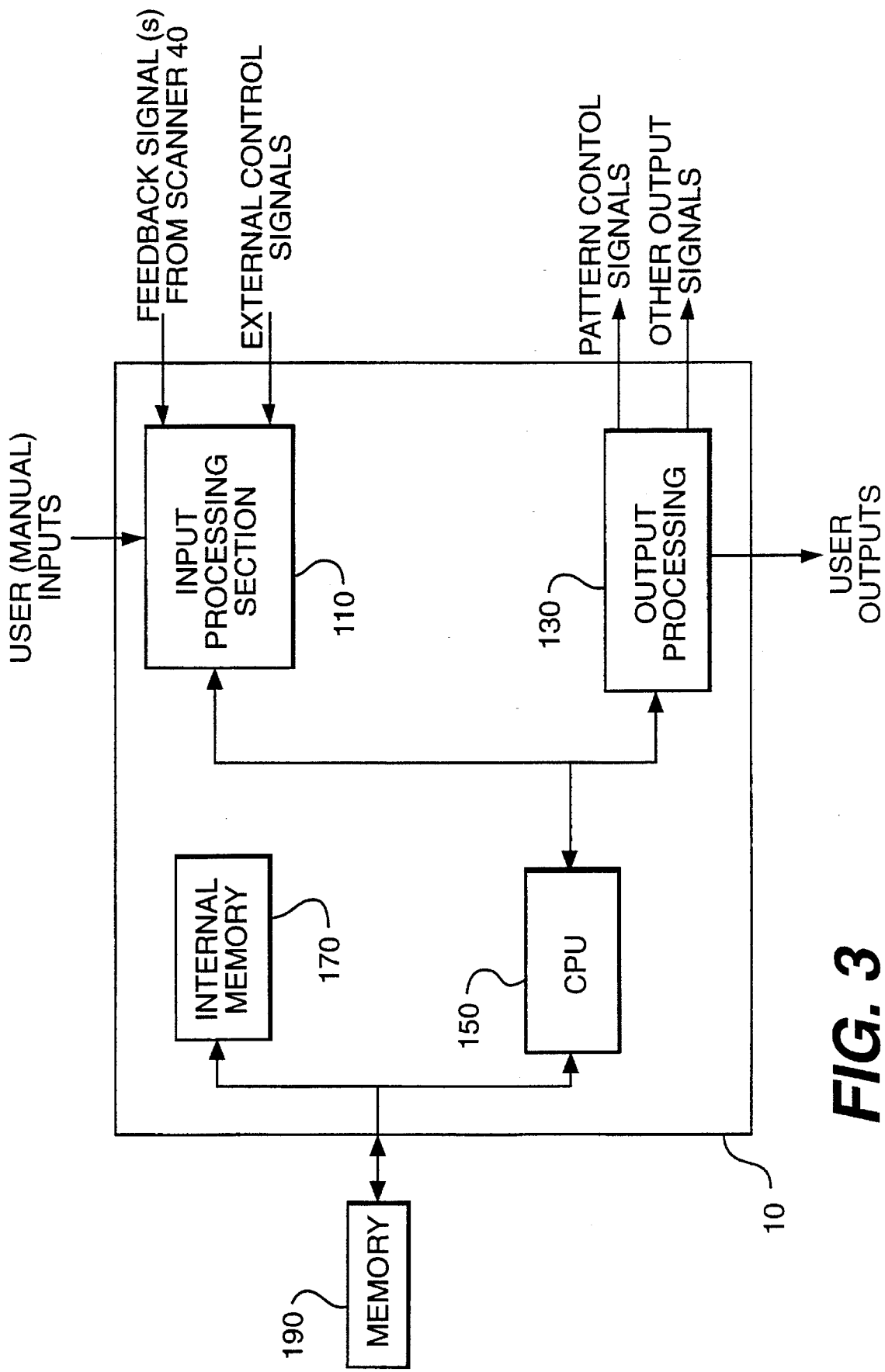
FIG. 3 is in block diagram illustrating the microprocessor shown in the scanning system of FIG. 1.

FIG. 3 generally illustrates an exemplary microprocessor 10 of the type used in an embodiment of the present invention. Input signals received from a user interface (not shown), scanner 40 (FIG. 1) or other external devices are received and processed in an input processing section 110. Input processing section 110 includes buffer circuits and other processing circuits which convert input signal levels and input signal forms into electrical signals compatible with internal microprocessor operations. Output processing section 130 analogously converts internal microprocessor electrical signals into output signals compatible with the user interface, pattern generator 20, rotator translator 30, scanner 40, and other external circuits.

In response to the various input signals, the control logic section 150 of microprocessor 10 calls subroutines from internal memory 170 or external memory 190, and executes the subroutines to adaptively alter the various output signals. Specific microprocessor operations will be described in greater detail in following sections.

C. THE PATTERN GENERATOR

Figure 4:
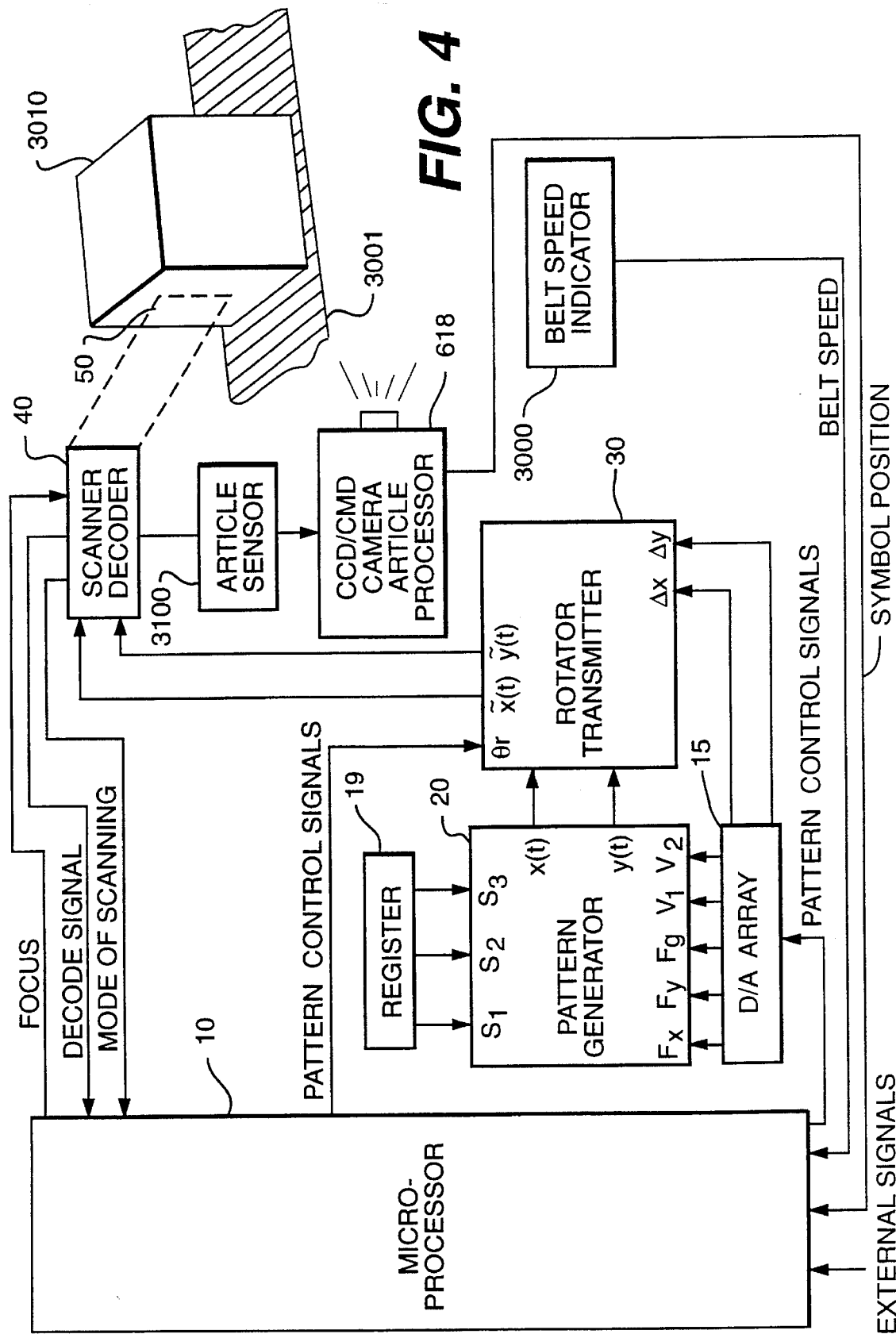
FIG. 4 is a block diagram illustrating the scanning system of FIG. 1 in greater detail.

FIG. 4 illustrates in greater detail the embodiment of the present invention shown in FIG. 1. A pattern generator circuit 20 of the type used in an embodiment of the present invention is shown in detail in FIG. 5.

Figure 6A:
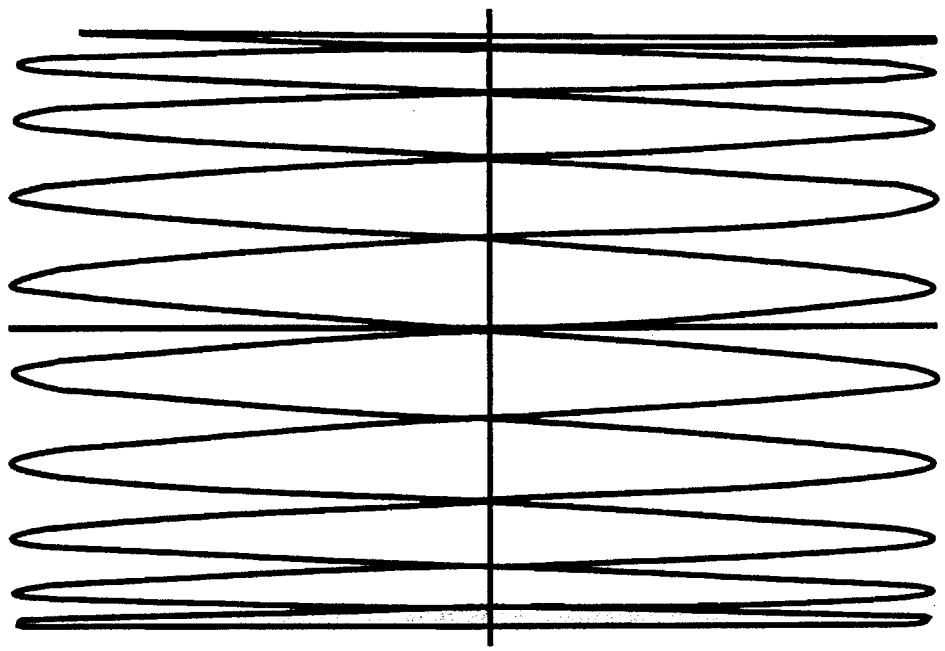
FIG. 6(a) is a diagram illustrating a standard (synchronous) raster light beam pattern.
Figure 6B:
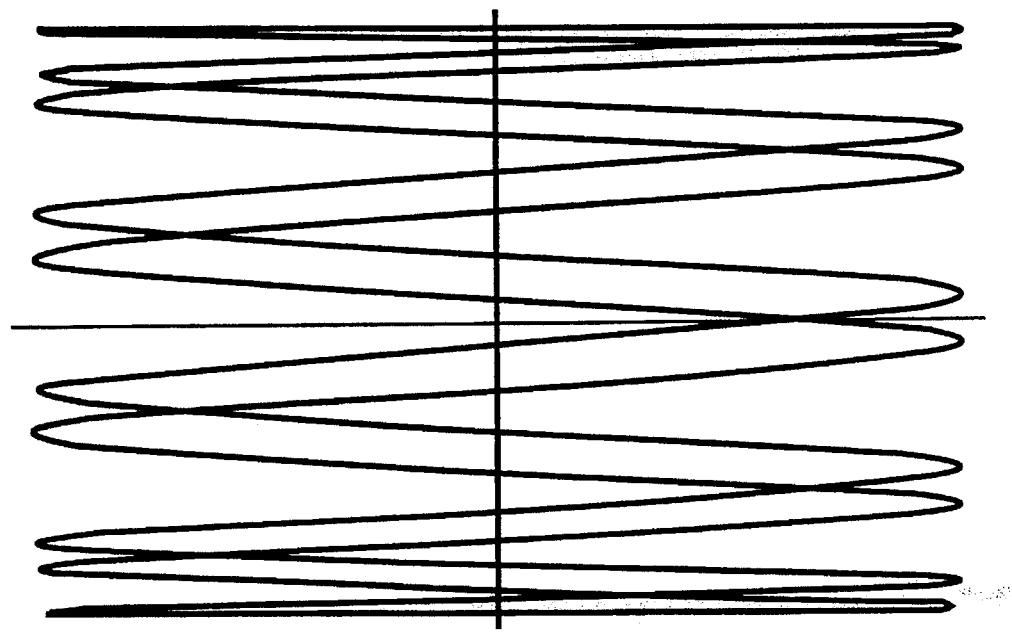
FIG. 6(b) is a diagram illustrating a jittering (asynchronous) raster light beam pattern.

In FIG. 4, microprocessor 10, in response to various feedback signals, generates pattern control signals including oscillator control signals fx, fg, and fy, switch signals S1, S2 and S3, and DC waveform control voltages V1 and V2. From this set of pattern control signals, pattern generator 20 generates coordinate control signals x(t) and y(t) which are applied to scanner 40 through rotator/translator 30. Several of the pattern control signals generated in microprocessor 10 are typically n-bit, signed digital words which are converted to analog form by output processing section 130 of the microprocessor 10 (see FIG. 6), or by an external D/A convertor array 15 shown, for example, in FIG. 7. Alternatively, conventional monolithic oscillators having digital inputs for frequency selection can be used. Single-bit switch signals may be held in output processing section 130 or in a register 17 internal or external to pattern generator 20.

FIG. 4 shows an embodiment of this invention that includes a CCD/CMD camera 618. An article sensor 3100 senses an article at a predetermined location. The CCD/CMD camera/article processor takes a picture of the moving article 3010 and outputs a symbol position signal to the microprocessor 10 reflecting a position of the symbol 50 on the article 3010. Scanner 40 scans the symbol based on the coordinate control signals output by the microprocessor 10. The microprocessor 10 determines whether a decode is valid based on a decode signal received from the scanner/decoder 40. A belt speed indicator 3000 outputs a speed of the belt to the microprocessor 10 to allow for tracking the moving article for additional symbol scans.

Figure 5:
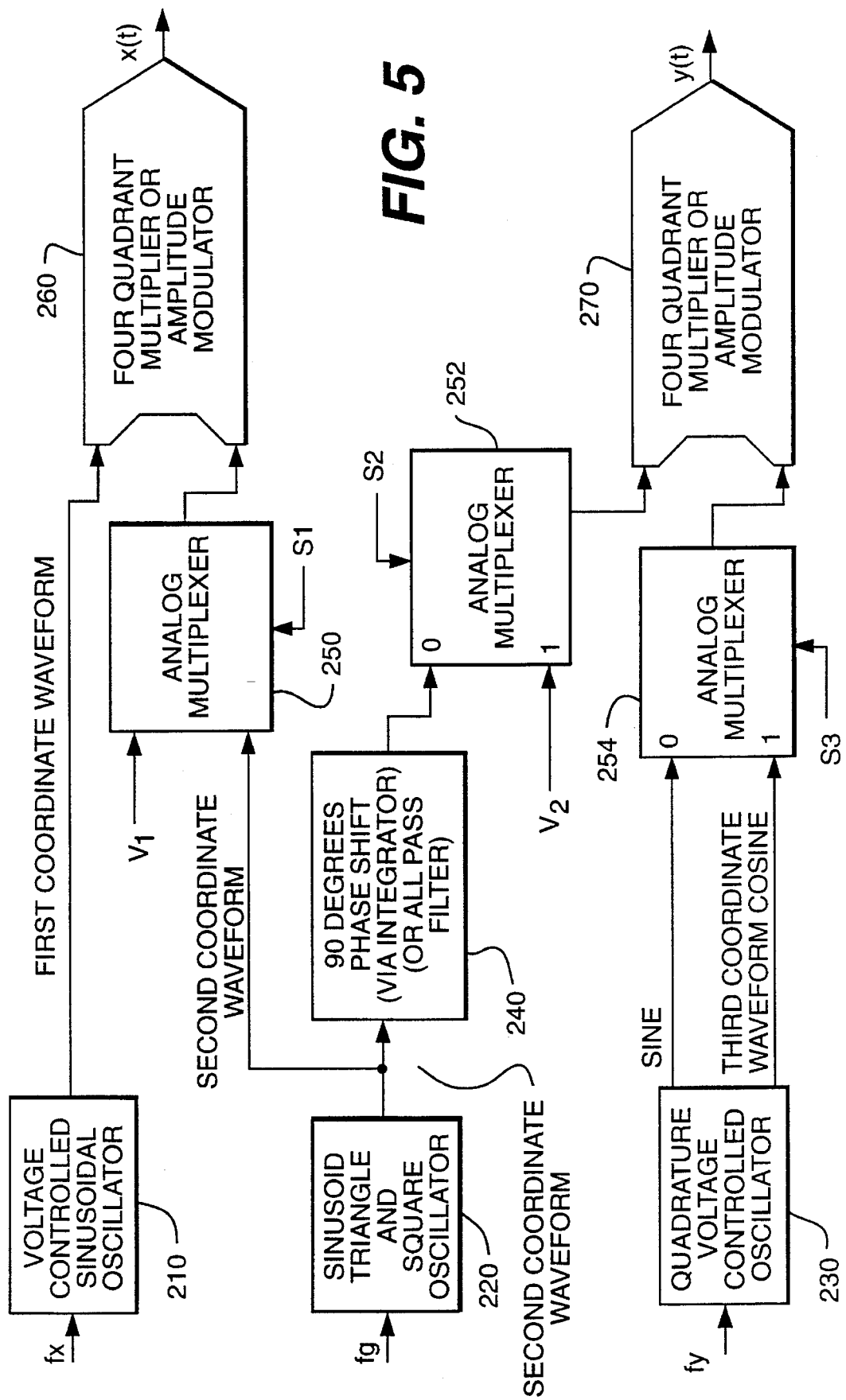
FIG. 5 is a block diagram illustrating an embodiment of the pattern generator shown in the scanning system of FIG. 1.

As shown in FIG. 5, once converted into analog form, oscillator control signals fx, fg, and fy are respectively applied to separate oscillators. First oscillator control signal fx is applied to the input of a conventional voltage controlled sinusoidal oscillator 210 to produce a first coordinate waveform signal which is applied to a first four quadrant multiplier (or amplitude modulator) 260.

Second oscillator control signal fg is applied to the input of sinusoid, triangle and square waveform oscillator 220. Conventional forms of this oscillator, for example NE566 manufactured by Signetics is commercially available. The output of oscillator 220 is applied to a second input of a first analog multiplexer 250. First waveform control voltage V1 is applied to a first input of first analog multiplexer 250. The output of first analog multiplexer 250 is selected in accordance with first switch signal S1, and applied to first four quadrant multiplier 260. The first coordinate control signal x(t) is, thus, a product of the first coordinate waveform and the output of first analog multiplexer 250.

The output of oscillator 220 is also applied to a first input of second analog multiplexer 252 through a 90° phase shifting circuit, such as an integrator circuit or an all pass filter. Second waveform control voltage V2 is applied to a second input of second analog multiplexer 252. The output of second analog multiplexer 252 is selected in accordance with second switch signal S2, and applied to second four quadrant multiplier 270.

Third oscillator control signal fy is applied to the input of a conventional quaduature voltage controlled oscillator 230. The output of oscillator 230 is generated in sine and cosine waveforms which are respectively applied to the first and second inputs of third analog multiplexer 254. The output of third analog multiplexer 254 is selected in accordance with third switch signal S3 and applied to second four quadrant multiplier 270. The second coordinate control signal y(t) is, thus, a product of the output of second analog multiplexer 252 and the output of third multiplexer 254.

The foregoing circuitry implements the following set of pattern generating equations:

$$x(t) = \begin{vmatrix} V1 & \text{if } S1 = 0 \\ \sin(2\pi fgt) & \text{if } S1 = 1 \end{vmatrix} \times |\sin(2\pi fxt)| \quad (1)$$

$$y(t) = \begin{vmatrix} \cos(2\pi fgt) & \text{if } S2 = 0 \\ V2 & \text{if } S2 = 1 \end{vmatrix} \times \begin{vmatrix} \sin(2\pi fyt) & \text{if } S3 = 0 \\ \cos(2\pi fyt) & \text{if } S3 = 1 \end{vmatrix} \quad (2)$$

The coordinate control signals x(t) and y(t) are applied to the scanner 40 in a manner discussed hereafter. When applied to scanner 40, the coordinate control signals control the pattern in which the light beam is directed at a barcode symbol proximate a predetermined location. As feedback signals change, the algorithms run in microprocessor 10 generate new values for pattern control signals fx, fg, fy, S1, S2, S3, V1 and V2. Resulting combinations of these pattern control signals generate new coordinate control signals, x(t) and y(t) which are better adapted to environmental conditions at the predetermined location and/or to condition affecting symbol readability.

Variations in the coordinate control signals x(t) and y(t) can produce an infinite variety of one- and two-dimensional light beam patterns. In addition to linear light beam patterns, the present invention can direct the light beam in the standard raster and jittering raster patterns shown in FIGS. 6(a) and 6(b). Other light beam patterns are also easily obtained by the present invention. FIGS. 7–13 illustrate exemplary two-dimensional light beam patterns obtainable by the present invention. Each exemplary light beam pattern is shown in relation to an X/Y reference axis of unity scale. As will be seen hereafter, the present invention may rotate each light beam pattern about the origin of the X/Y reference axis and/or scale the actual size of the light beam pattern at the predetermined location.

Figure 7:
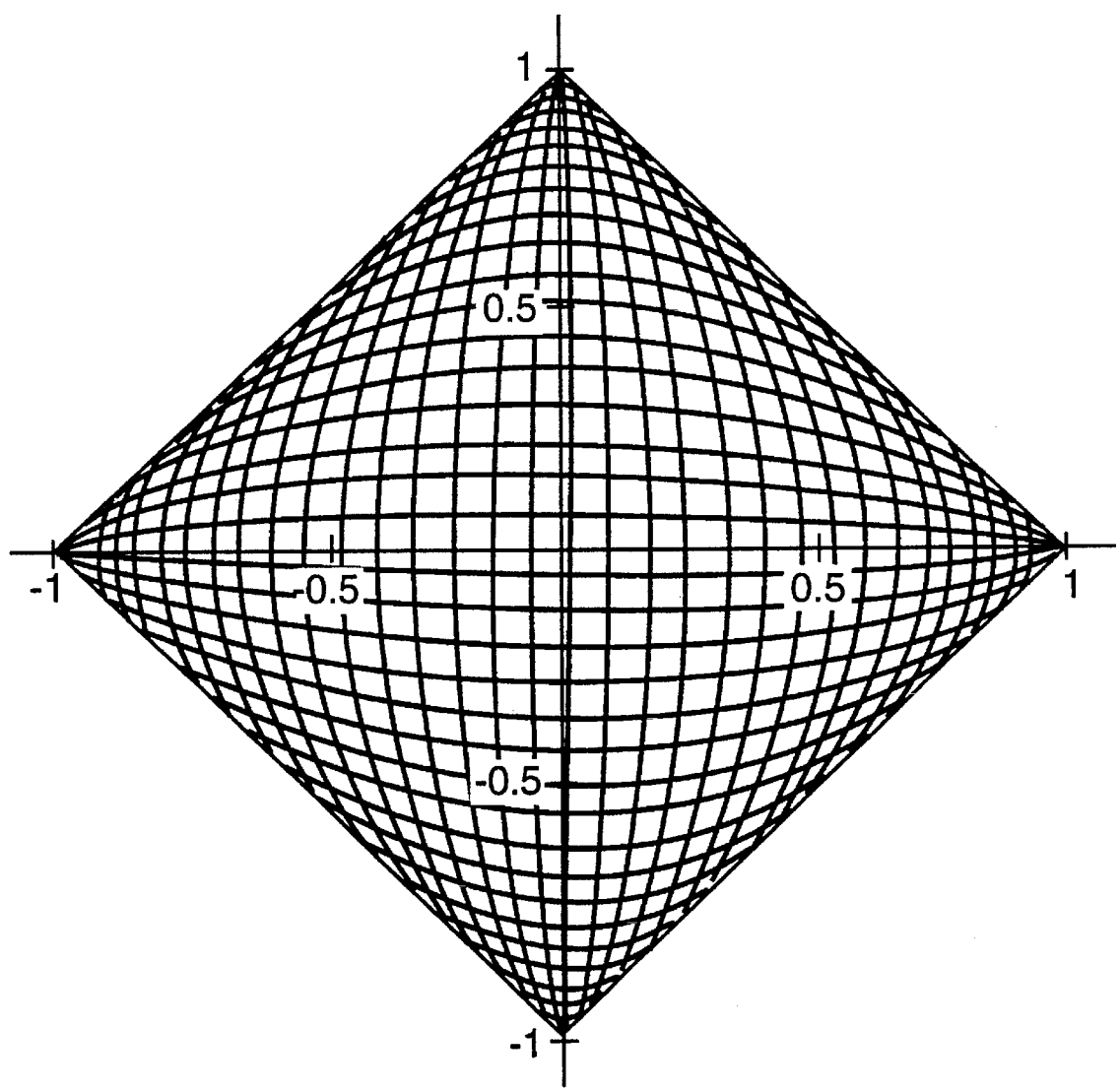
FIG. 7 is a diagram illustrating a "grid" shaped light beam pattern.
Figure 8:
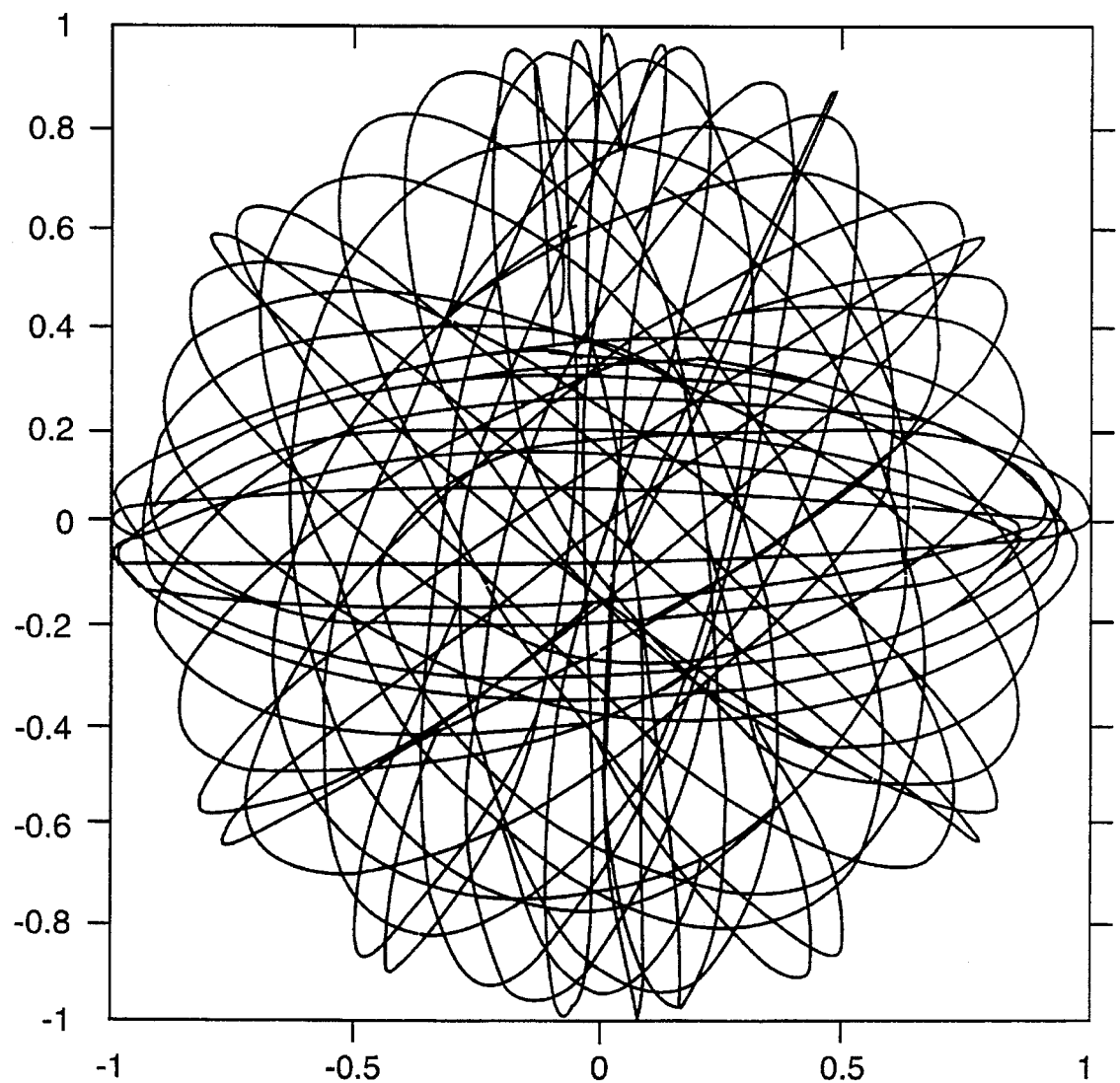
FIG. 8 is a diagram illustrating a rotating and breathing ellipse light beam pattern.
Figure 9:
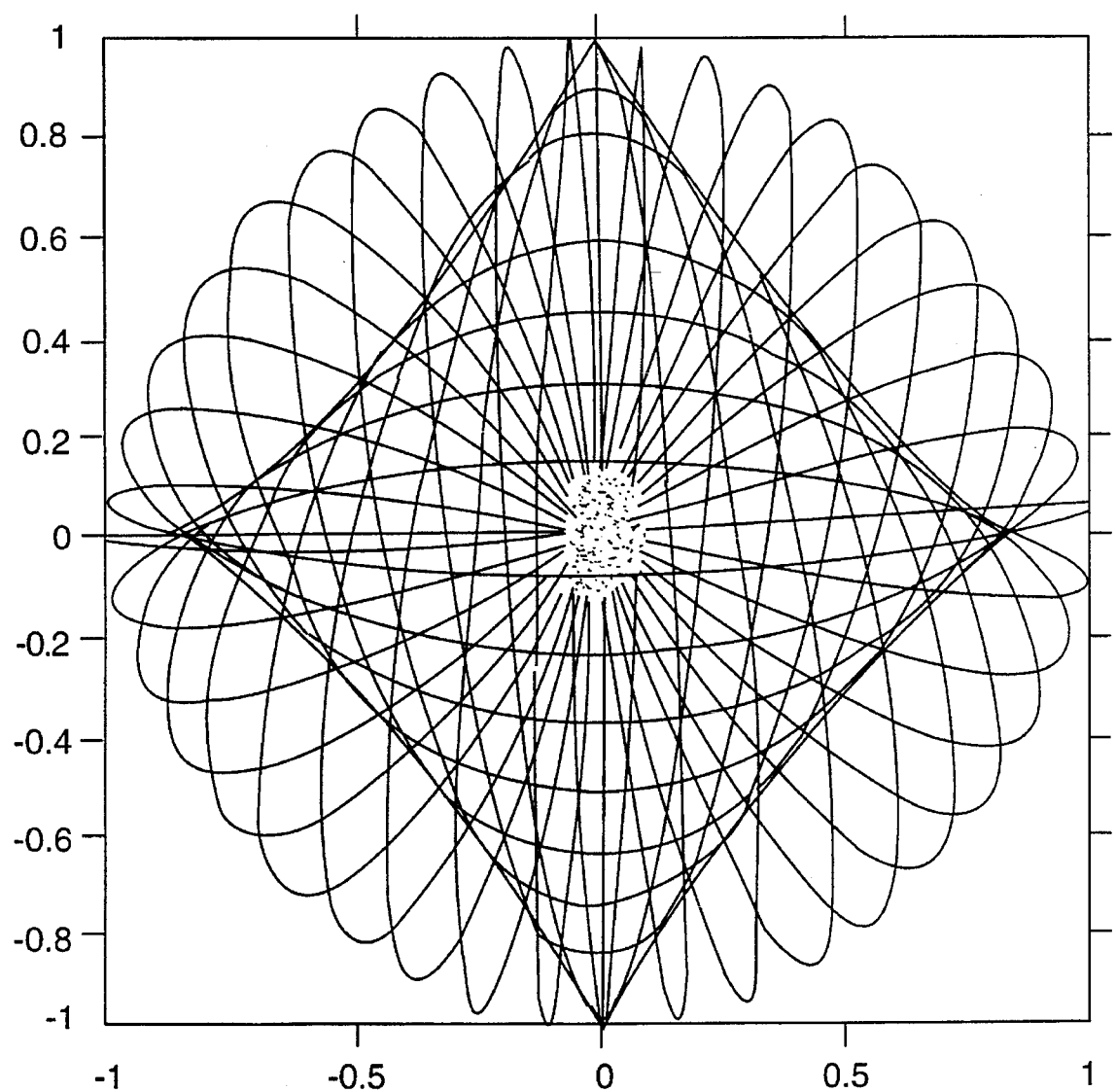
FIG. 9 is a diagram illustrating a rotating and breathing lissajous light beam pattern.
Figure 10:
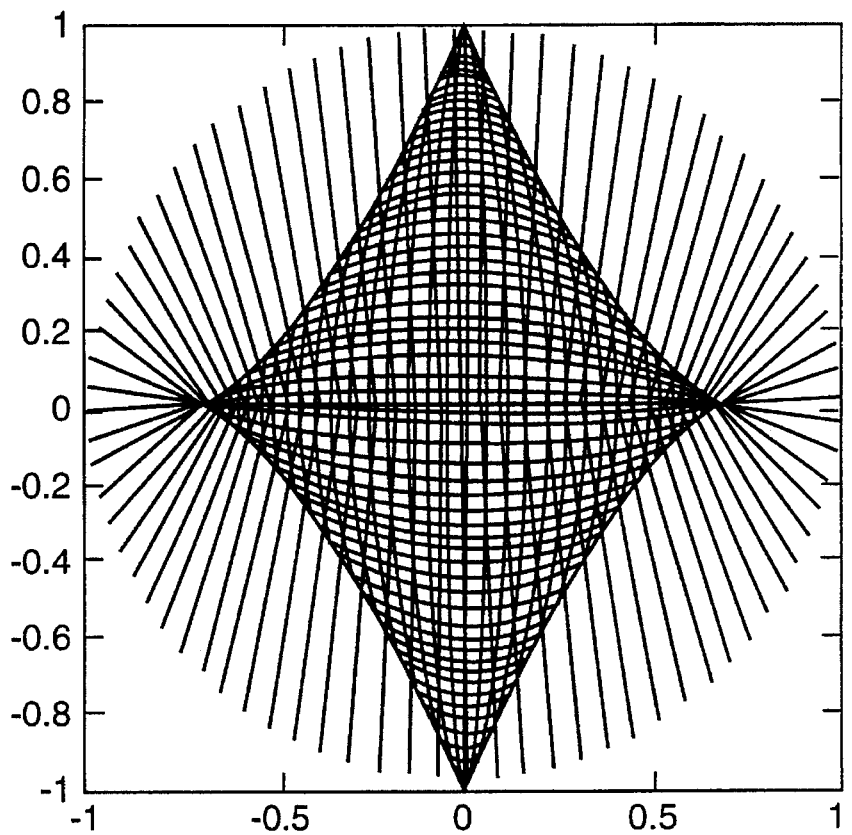
FIG. 10 is a diagram illustrating a "fishbone" shaped light beam pattern.
Figure 11:
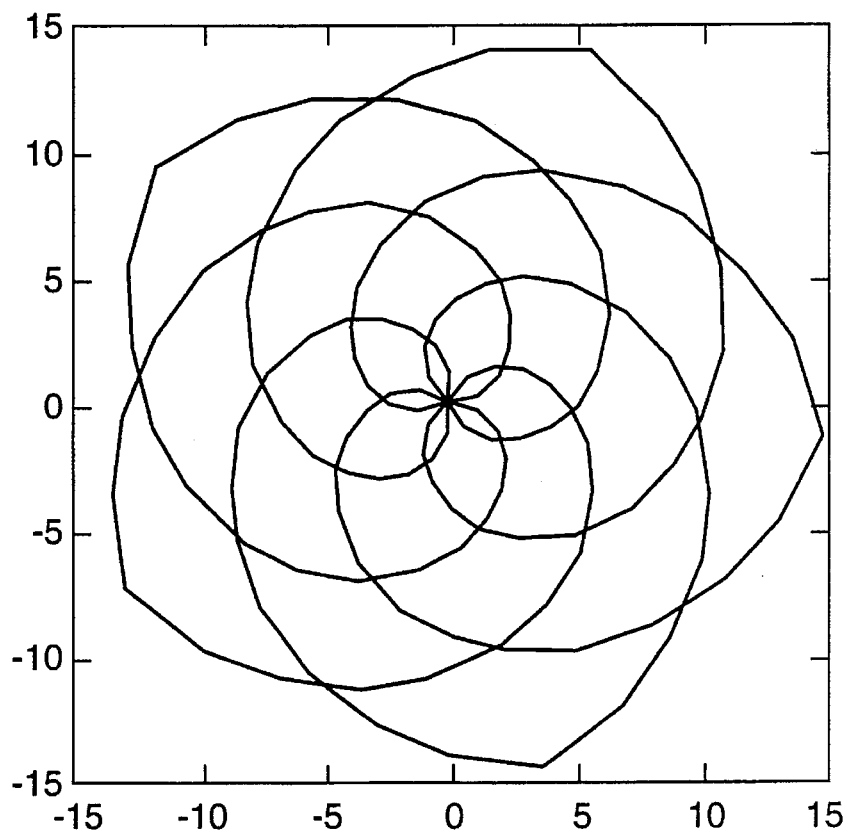
FIG. 11 is a diagram illustrating a "petal" shaped light beam pattern.
Figure 12:
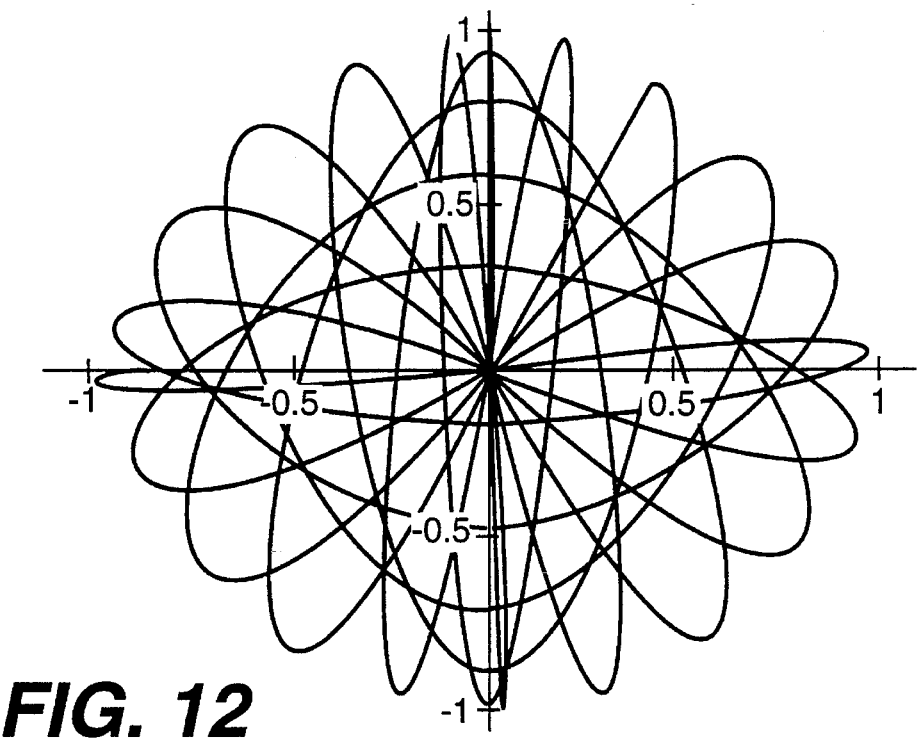
FIG. 12 is a diagram illustrating a jittering lissajous light beam pattern.
Figure 13:
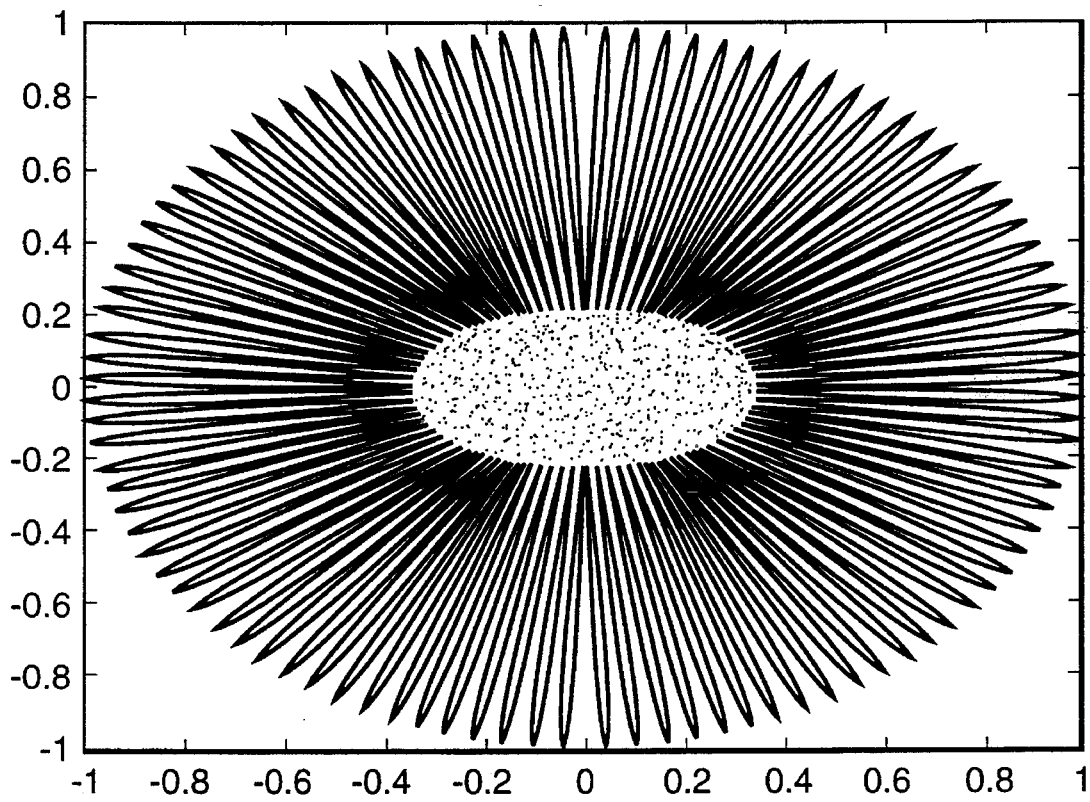
FIGS. 13 is a diagram illustrating a "star" shaped light beam pattern.

FIG. 7 illustrates a "grid" type light beam pattern. FIG. 8 illustrates a rotating and breathing ellipse, and FIG. 9 illustrates a rotating and breathing lissajous. FIG. 10 illustrates a "fishbone" type light beam pattern, and FIG. 11 a "petal" shaped light beam pattern. FIG. 12 illustrates a jittering lissajous, and FIG. 13 illustrates a "star" shaped light beam pattern.

Each light beam pattern has its own unique utility relative to a barcode symbol variously oriented within the X/Y reference axis, and relative to the environmental conditions surrounding the reference axis. For example, the fishbone pattern in FIG. 10 offers improved chances of reading a barcode symbol vertically or horizontally proximate to the origin of the X/Y reference axis. However, the fishbone pattern in FIG. 10 also reduces the chances of reading a barcode symbol in the outlining regions away from the origin. The particular utility offered by any given light beam pattern is determined by its application in a given situation.

D. THE ROTATOR/TRANSLATOR

Figure 14A:
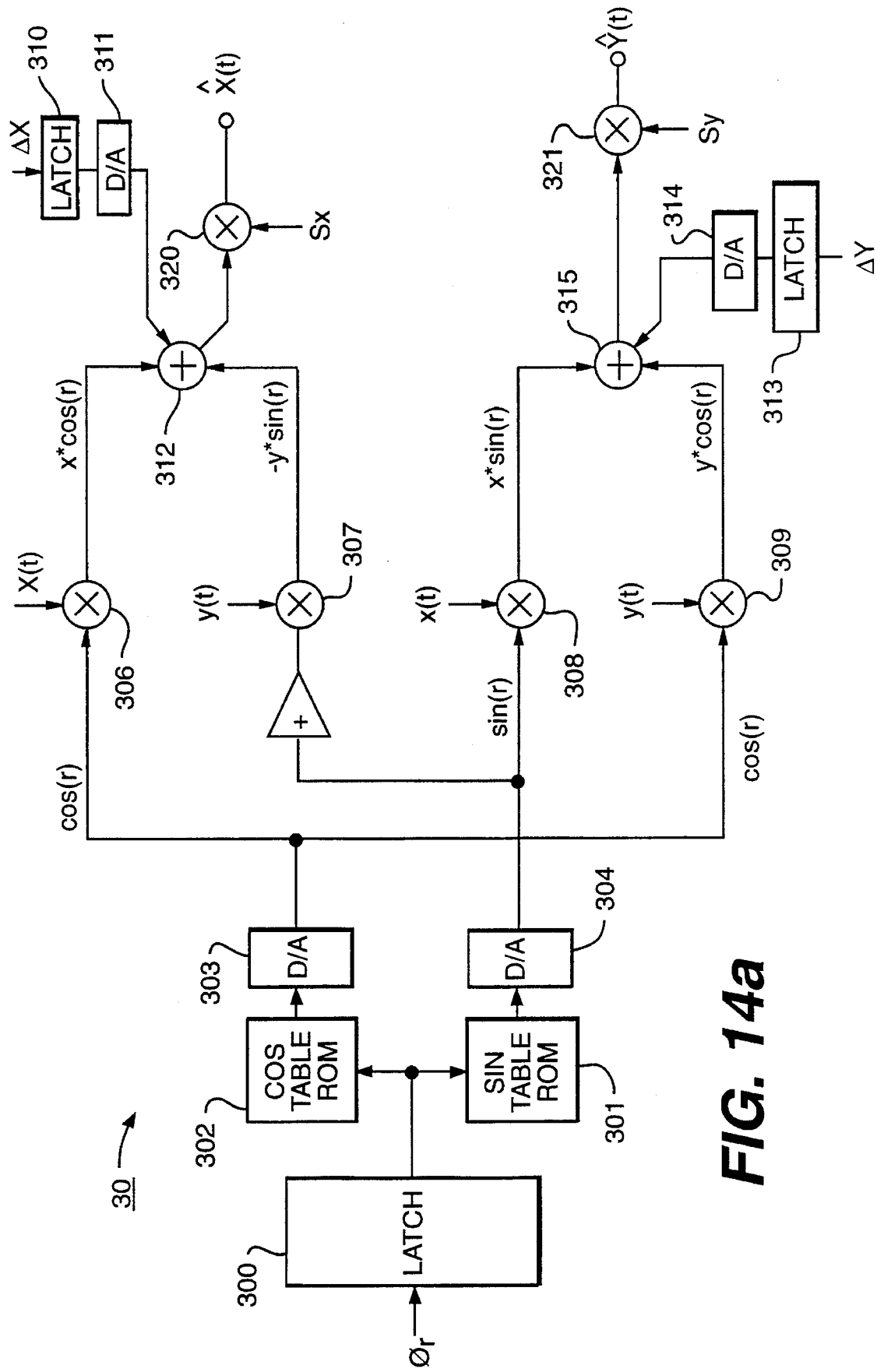
FIG. 14a is a block diagram illustrating an embodiment of the rotator/translator shown in FIG. 1.

FIG. 14a illustrates a first example of a rotator/translator circuit 30 of the type used in an embodiment of the present invention. Microprocessor 10 (FIG. 3), in response to various feedback signals, generates pattern control signals which may include a displacement signal. The displacement signal is typically expressed in components: an angular rotation component, and one or more offset components.

As previously discussed, scanner 40 directs a light beam pattern at a predetermined location. The disposition of the light beam at the predetermined location can be expressed in relation to a reference X/Y coordinate axis. FIG. 15(*a*) shows a X/Y reference axis with a standard raster light beam pattern superimposed on it. At its present angular orientation, the standard raster scans only a portion of the barcode symbol. A feedback signal, discussed hereafter, indicates the skewed angular disposition of the symbol to the standard raster light beam pattern. In response to the signal having an angular rotation component, $\Theta_r$ feedback signal, microprocessor 10 generates a displacement In response to the angular rotation component of the displacement signal, rotator/translator 30 transforms the $x(t_1)$ and $y(t_1)$ coordinate control signals corresponding to the standard raster shown in 15(*a*) into new $x(t_2)$ and $y(t_2)$ coordinate control signals which correspond to the new standard raster shown in FIG. 15(*b*). The standard raster shown in 15(*b*) is rotated about the reference axis by angle $\Theta_r$ relative to the standard raster shown in 15(*a*).

Typically, symbols present at a predetermined location are offset in the X direction and/or the Y direction, as well as, being angularly rotated with reference axis. Such is the case shown in FIG. 15(*c*), where the barcode symbol is offset from the reference axis origin by $\Delta x$ and $\Delta y$ distances as well as being rotated by an angle $\Theta_r$. Feedbacks signals, discussed hereafter, indicate the relative disposition of the symbol within the reference axis. In response to the feedback signals, microprocessor 10 generates a displacement signal having an angular rotation component, an X-offset component, and a Y-offset component.

Figure 18:
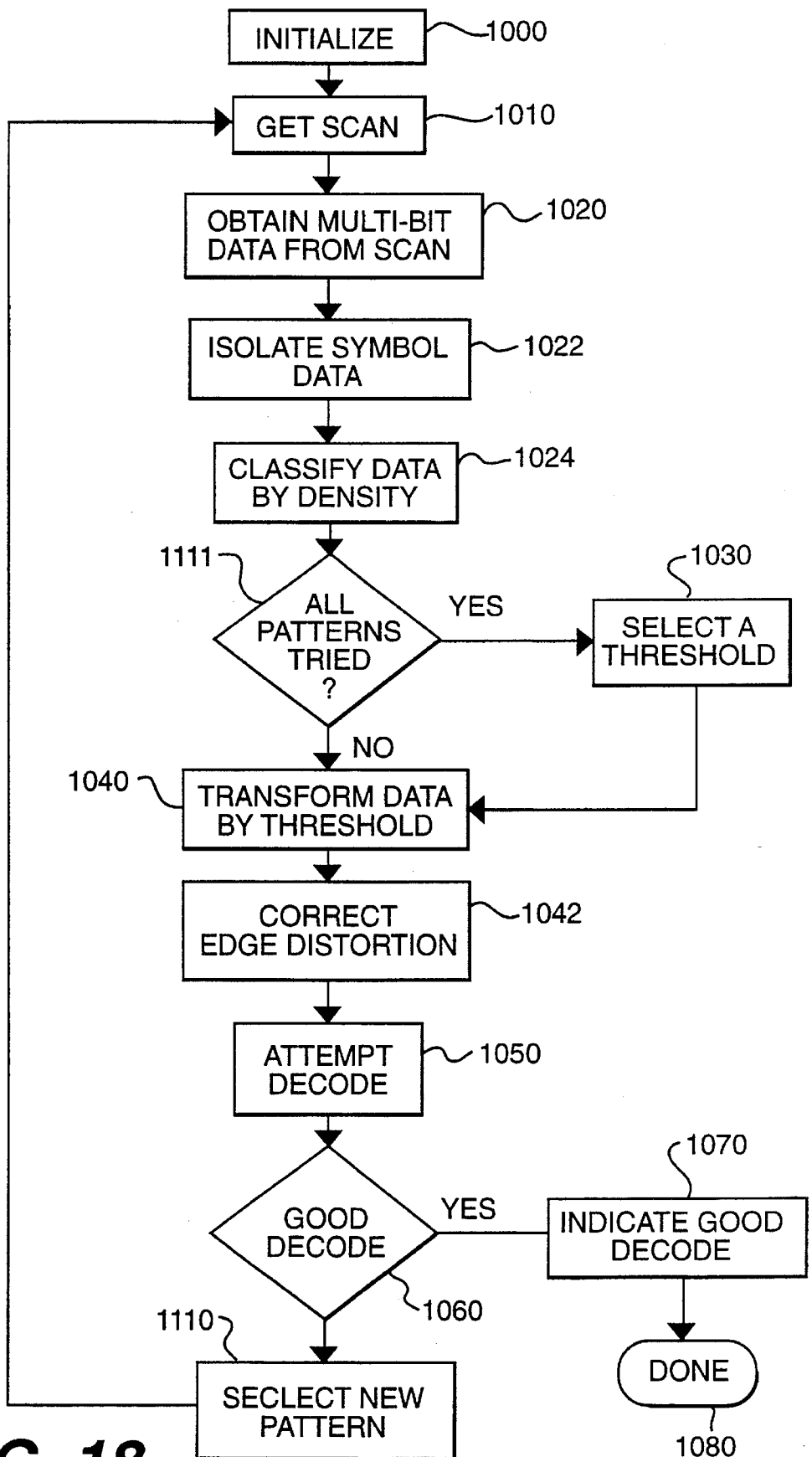
FIG. 18 is a flowchart illustrating another operation of a multi-bit digitizer in the scanning system of FIG. 1.

In response to that displacement signal, rotator/translator 30 transforms $x(t_1)$ and $y(t_1)$ coordinate control signals corresponding to the raster shown in FIG. 18(*c*) into new coordinate control signals, $x(t_2)$ and $y(t_2)$, corresponding to the raster shown in FIG. 15(*d*). The raster in FIG. 15(*d*) has been rotated about the reference axis origin by angle $\Theta_r$ and translated a distance corresponding to the and offset components.

In FIG. 14*a*, the angular rotation component $\Theta_r$, and offset components $\Delta X$ and $\Delta Y$ are applied to rotator/translator circuit 30. The n-bit, signed digital word that represents angular rotation component $\Theta_r$ is applied from the microprocessor 10 to angle latch 300. Sine and cosine functions are addressed in respective ROM look-up tables 301 and 302. Sine and cosine functions might also be directly supplied from microprocessor 10. The n-bit, signed digital Words that represent the X offset ($\Delta X$) and Y offset ($\Delta Y$) are applied to latches 310 and 313, converted into analog form by D/A converters 311 and 314, and applied to summers 312 and 315, respectively. The digital sine and cosine functions generated from the ROM look-up tables 302 and 301 are converted to analog form by D/A convertors 303 and 304, respectively, and applied to multipliers 306, 307, 308, and 309.

First multiplier 306 multiplies original coordinate control signal x(t) with function cos(r) to produce x(t)*cos(r). Second multiplier 307 multiplies original coordinate control signal y(t) with the negative value of function sin(r) to produce y(t)*–sin(r). Similarly third and fourth multipliers, 308 and 309 respectively, produce x(t)*sin(r) and Y cos(r), respectively. The products of first and second multipliers, 306 and 307, respectively, are applied to first summer 312 along with X-offset to produce transformed coordinate control signal X(t). The products of third and fourth multipliers, 308 and 309 respectively, are applied to second summer 315 along with Y-offset to produce transformed coordinate control signal Y(t).

The foregoing circuit implements rotation and translation about a reference axis in accordance with the equation shown below.

$$\begin{vmatrix} \hat{X}(t) \\ \hat{Y}(t) \end{vmatrix} = \begin{vmatrix} \cos(\Theta_r) & -\sin(\Theta_r) \\ \sin(\Theta_r) & \cos(\Theta_r) \end{vmatrix} \begin{vmatrix} X(t) \\ Y(t) \end{vmatrix} + \begin{vmatrix} \Delta X \\ \Delta y \end{vmatrix} \quad (3)$$

In the equation, X(t) and Y(t) denote the original coordinate control signals, $\hat{X}(t)$ and $\hat{Y}(t)$ denote the transformed coordinate control signals, $\Theta_r$ is the angular rotation component, $\Delta X$ is the X-offset, and $\Delta Y$ is the Y-offset.

Rotator/translator 30 can be implemented in hardware in combination with the circuitry comprising pattern generator 20, or can be implemented as a separate, serially connected circuit. Alternately, rotator/translator 30 and pattern generator 20 functions may be partially or fully implemented in software.

Figure 14B:
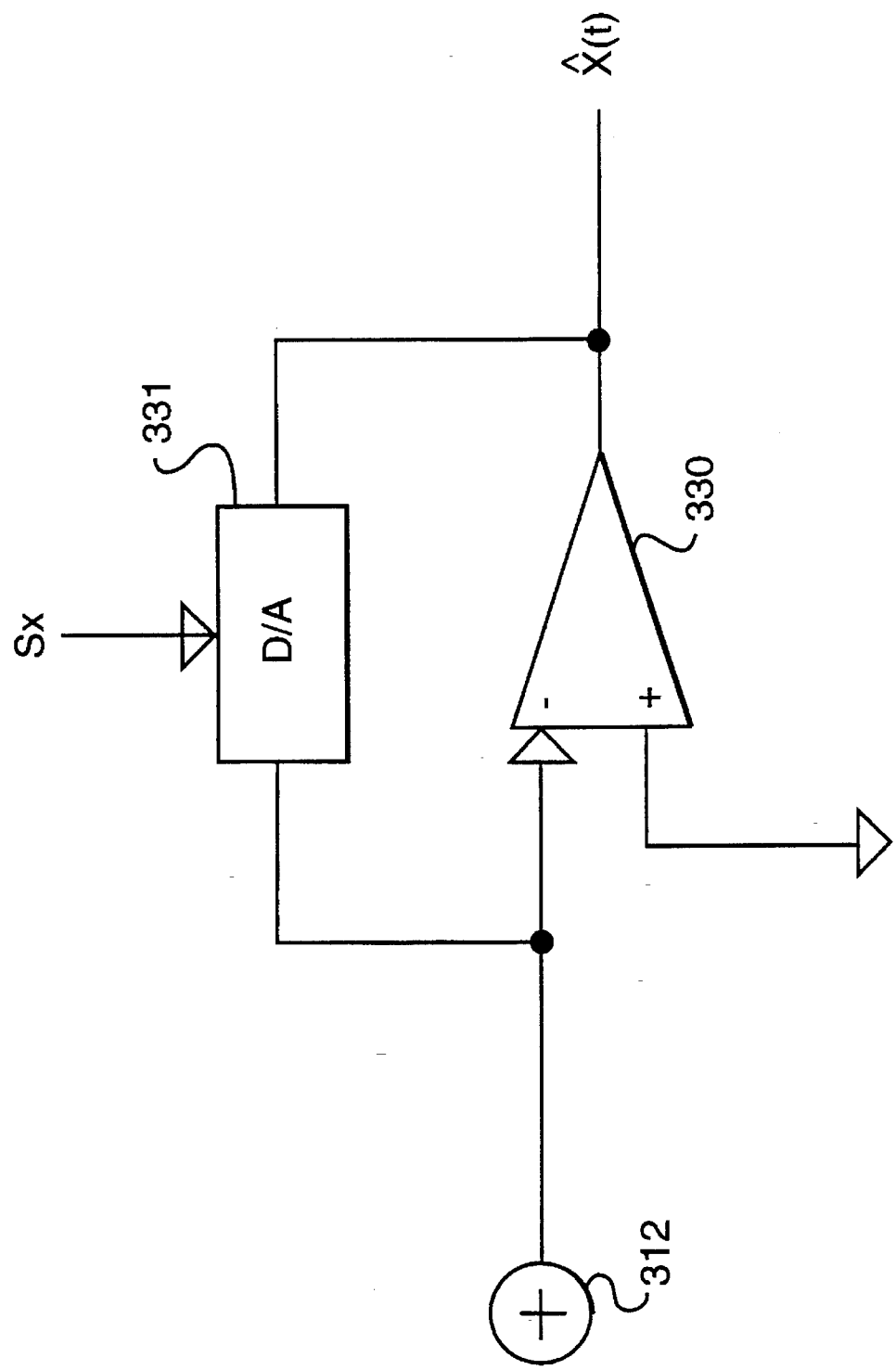

As part of either the rotator/translator 30 or the pattern generator 20, an embodiment of the present invention may include a circuit or software routine to scale the size of the light beam pattern at the predetermined location. The scaling operation can be expressed by the following equation:

$$\begin{vmatrix} \hat{X}(t) \\ \hat{Y}(t) \end{vmatrix} = \begin{vmatrix} S_x & 0 \\ 0 & S_y \end{vmatrix} \begin{vmatrix} X(t) \\ Y(t) \end{vmatrix} \quad (4)$$

where $S_x$ and $S_y$ are selected scaling factors for coordinate control signals X(t) and Y(t), respectively. This equation can be implemented in a circuit similar to that shown in FIG. 17*a* where "multiplier" 320 receives the output of summer 312 and scaling factor signal $S_x$, and "multiplier" 321 receives the output of summer 315 and scaling factor signal $S_y$. The term "multiplier" is used to describe the scaling product derived from circuit elements 320 and 321. As shown in FIG. 14*b*, "multipliers" 320 and 321 may be implemented by differential amplifier 330 and DAC 331.

Figure 14C:
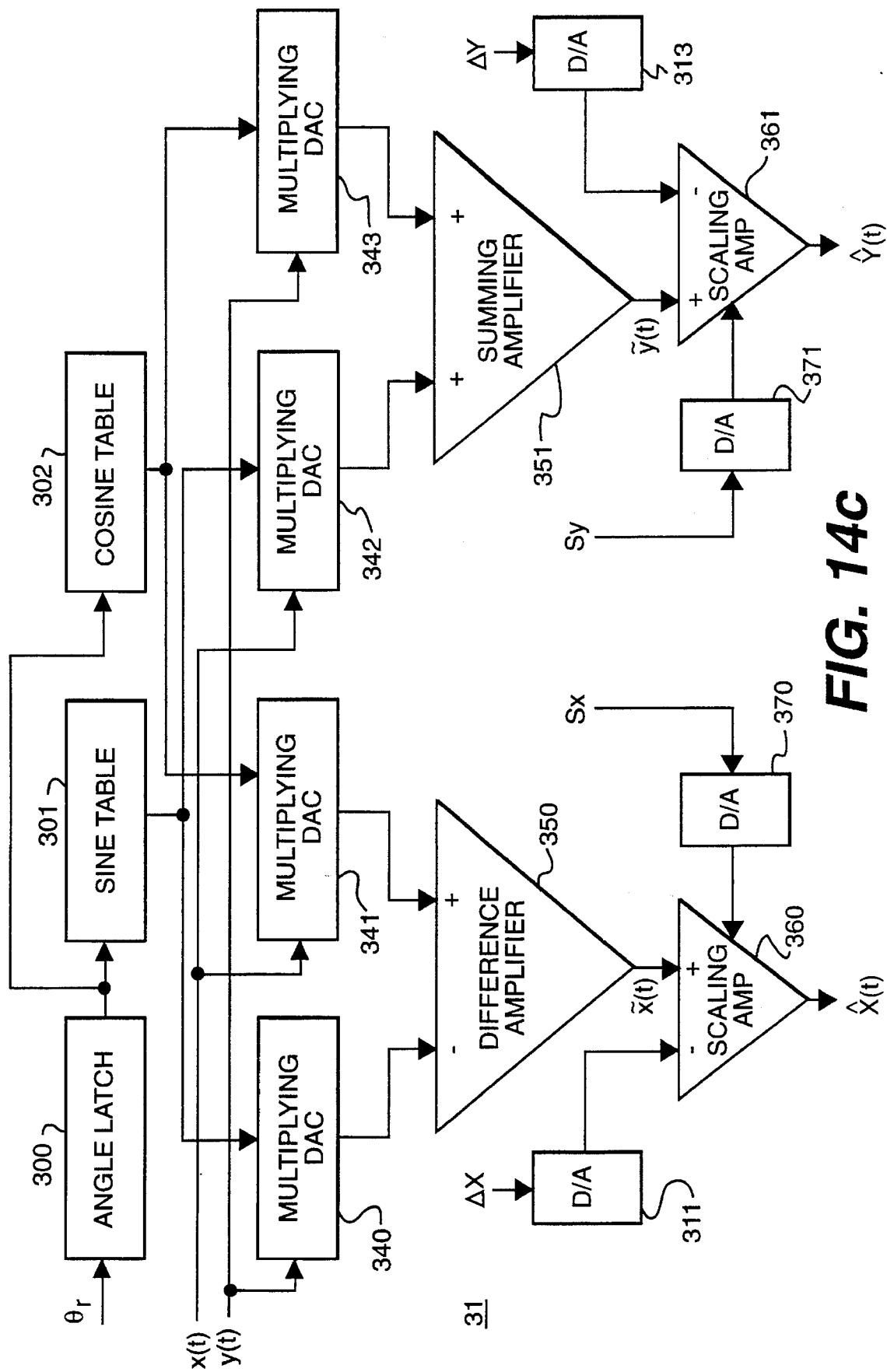
FIG. 14c is a block diagram illustrating another embodiment of the rotator/translator shown in FIG. 1.
Figure 15A:
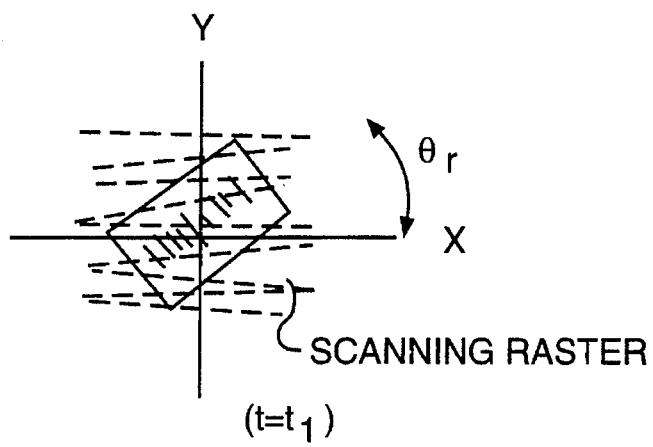
FIG. 15(a)–15(d) are diagrams explaining the rotation and translation of a light beam pattern.
Figure 15B:
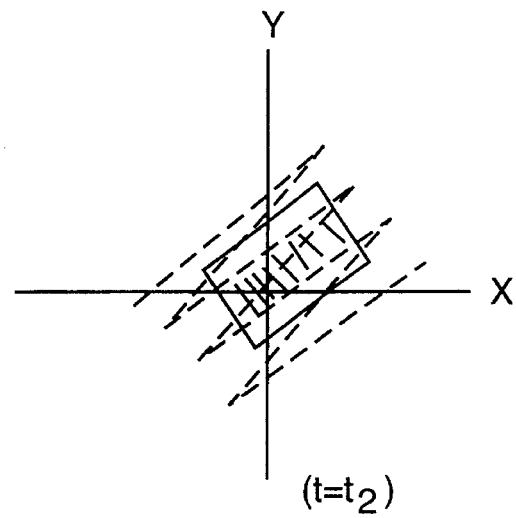
Figure 15C:
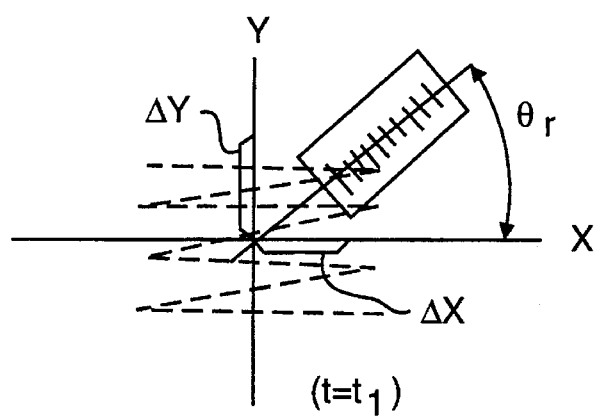
Figure 15D:
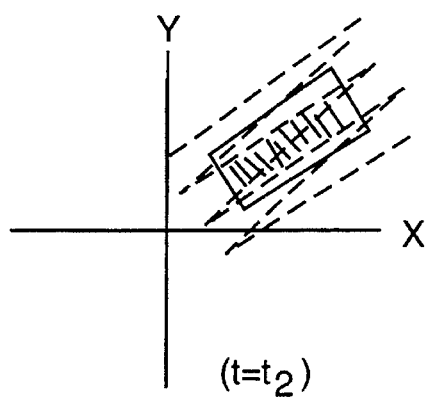

FIG. 14*c* illustrates a second example of a rotator/translator circuit 31 of the type used in an embodiment of the present invention. Similar elements to the device shown in FIG. 14*a* are similarly designated. The angular rotation component, $\Theta_r$, and offset components, $\Delta X$ and $\Delta Y$, are applied to rotator/translator circuit 31. The angle measurement is preferably based on a counter-clockwise rotation X offset, $\Delta X$, is applied through D/A converter 311 to first scaling amplifier 360, and Y offset, $\Delta Y$, is applied through D/A converter 314 to second scaling amplifier 361. Angular rotation component $\Theta_r$ is applied to angle latch 300 and converted into a signed 8-bit word by look-up tables 301 and 302.

The resulting sine(r) and cosine (r) functions from look-up tables 301 and 302 are applied with coordinate control signals x(t) and y(t) to first, second, third and fourth multiplying DACs 340, 341, 342, and 343 as shown in FIG. 17*c*. First multiplying DAC 340 produces first product y(t)*sin(r) which is applied to a first input of differential amplifier 350. Second multiplying DAC 341 produces second product x(t)*cos(r) and applies it to the second input of differential amplifier 350. Similarly, third and fourth multiplying DACs 342 and 343 produce third product x(t)*sin(r) and fourth product y(t)*cos(r) respectively, and apply these products to the first and second inputs of summing amplifier 351.

Differential amplifier 350 produces rotated coordinate control signal $\tilde{x}(t)=x(t)* \cos(r)-y(t)* \sin(r)$. This signal is subsequently scaled in accordance with scaling factor Sx, and translated in accordance with X offset, $\Delta X$, in first scaling amplifier 360. The product of first scaling amplifier 360 is transformed coordinate control signal $\hat{X}(t)$.

Summing amplifier 351 produces rotated coordinate control signal $\tilde{y}(t)=x(t)*\sin(r)+y(t)*\cos(r)$. This signal is subsequently scaled in accordance with scaling factor Sy, and translated in accordance with Y offset, $\Delta Y$, in second scaling amplifier 367. The product of second scaling amplifier 361 is transformed coordinate control signal $\hat{Y}(t)$.

The benefits of the exemplary rotator/translator circuits in FIGS. 14a and 14c as compared with comparable mechanical rotator/translators are readily apparent. For example, the speed of the exemplary rotator/translator circuits is improved, and the lack of moving parts increases reliability. Scaling can also be achieved in the generation circuitry of the drive signals in scanner 40, or in software.

E. THE SCANNER

The term "scanner" heretofore used in reference to general X/Y scanner element 40 of FIG. 1 includes scanning heads and related control circuitry previously described in the commonly assigned patents referenced in the BACKGROUND OF THE INVENTION and in the foregoing description.

Figure 16A:
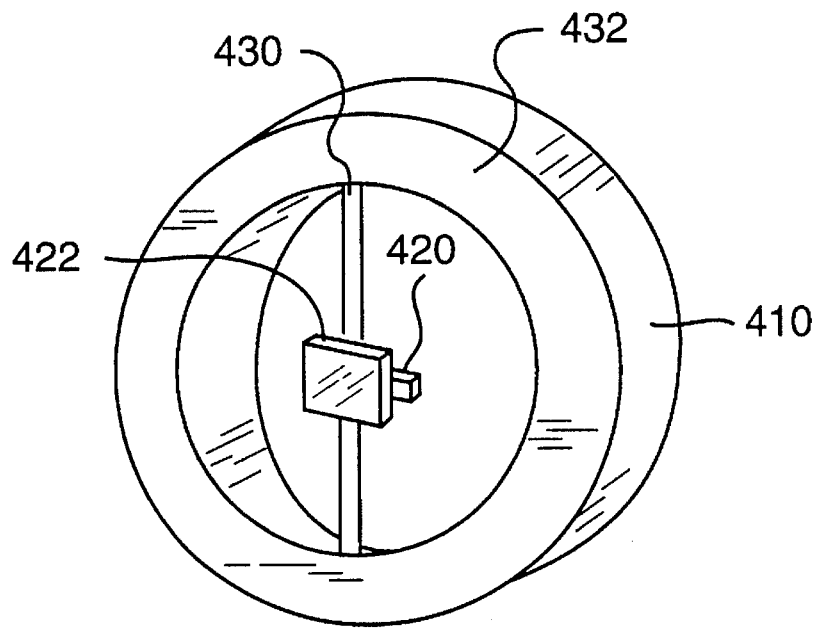
FIG. 16a is a schematic block diagram illustrating an embodiment of an X/Y scanning head within the scanner of FIG. 1.
Figure 16B:
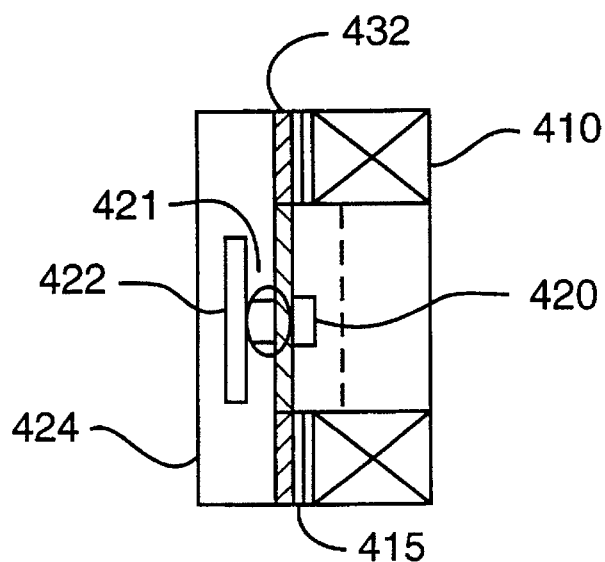

FIGS. 16a and 16b illustrate an exemplary scanning element for use within scanner 40. The torsional miniature scan element 400 shown in FIGS. 16a and 16b provides a range of operating frequencies between approximately 1 Hz to 180 Hz without physical or mechanical adjustments or tuning. In FIG. 16a mirror 422 and permanent magnet 420 are opposingly attached to and mechanically balanced on a flexible strip 430. This flexible stir is attached to opposite sides of a coil 410 by means of a flexible strip holder 432.

FIG. 16b is a cut-away side view of FIG. 16a. In FIG. 16b, the magnet/mirror holder 421 which attaches mirror 422 and permanent magnet 420 to flexible stirp 430 can be seen. A shock-absorber 415 may be interposed between the flexible strip holder 432 and coil 410. Finally, a transparent mirror protector 424 may be attached to the scan element 400.

When an alternating current coordinate control signal is applied to coil 410, interaction of the magnetic fields of the coil 410 and permanent magnet 420 cause the flexible strip 430 to torsionally oscillate. X–Y scanning may be accomplished by the dual scan element arrangement shown, for example, in FIG. 16c.

Figure 16C:
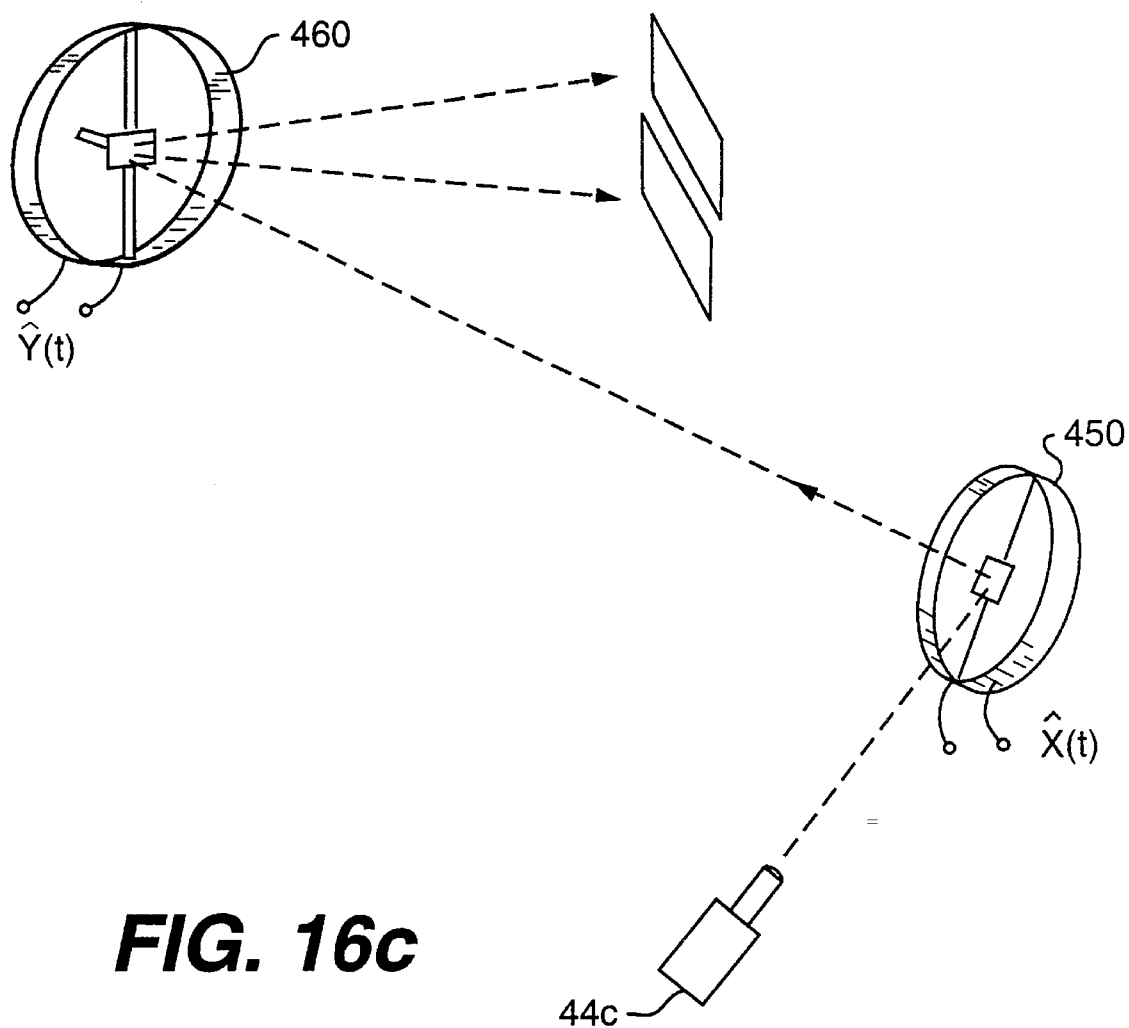
FIG. 16c is a schematic block diagram illustrating an embodiment of an X and a Y scanning head within the scanner of FIG. 1.

In FIG. 16c, a light beam from laser source 440 is directed to X-scan element 450 which deflects the light beam to Y-scan element 460. The light beam directed from Y-scan element 460 is scanned in a predetermined pattern determined by coordinate control signals X(t) and Y(t).

F. MODES OF OPERATION

The present invention provides for operation in one of three basic modes; learning mode, adapted mode, and real-time adaptive mode.

Learning mode allows the scanning system to "learn" a best light beam pattern for various applications. Thus, in fixed-mode applications where articles with symbols are presented to the scanning system under fairly repeatable conditions, the scanning system can try combinations of output power, focus adjustment, and light beam pattern (location, shape, size, and/or orientation) and then collect readability data for each combination. Once sufficient statistical data (percent decode, decode speed, decode thresholding) is accumulated, the scanning system can select and store in memory an optimal combination of operating parameters. Optimal combinations of operating parameters may be stored for one-dimensional and two-dimensional barcode symbols. A user may then select the "learned" set of parameters from memory for a particular application, or the scanning system may automatically select a "learned" set of parameters. The software and/or hardware to accomplish the learning mode may reside in a neural network controlled by fuzzy logic.

A scanning system may also learn optimal combinations of operating parameters for hand-held applications. For example, small raster patterns have shown improved results over single-line scans in reading truncated one-dimensional barcode symbols. A truncated barcode symbol is one which because of its small Y/X aspect ratio, is not completely scanned by the light-beam pattern. The present invention provides the ability to learn an optimal small raster scan for reading one-dimensional barcode symbols.

Small raster scans are defined by $x(t)=X_{max}\sin(2\pi fxt)$, and $y(t)=Y_{max}\sin(2\pi fyt)$. Assuming $fx=60H_z$ and that the maximum amplitude of x, $X_{max}$, is fixed, the ratios fx/fy and $Y_{max}/X_{max}$ are referred to as the frequency and height ratios. The frequency and height ratios may be selected to optimize barcode symbol readability depending on the type and size of symbol read.

Once a set of optimal operating parameters has been obtained and entered into the control logic of the scanning system, the system will operate in a set, or adapted mode until instructed to operate otherwise. Thus, a scanning system operating in adapted mode will direct the light beam according to the "learned" set of operating parameters. An adapted mode of operation can be overridden by manual or other external signals, as well as, by internal override signals which arise if the adapted mode fails to decode symbols due to some change in the environment.

In applications, such as the following conveyor belt and fixed presentation examples where the nature and disposition of symbols is highly variable, the scanning system may be operated in a real-time adaptive mode. In the real-time adaptive mode, the scanning system continually seeks to adjust scanning system operating parameters, and in particular the light beam pattern, to maximize symbol readability. Once again, control of the real-time adaptive mode may be accomplished using fuzzy logic.

G. FEEDBACK SIGNALS

Many different feedback signals may be used by microprocessor 10 (FIG. 1) to adapt the light beam pattern directed at the predetermined location. These feedback signals may be divided into two categories: internal feedback signals derived from a detected portion of the reflected light beam or from a source within the scanning system, and control signals. Examples of both categories are discussed below.

(1) Percent Decode

Upon obtaining a scan, the scanning system of the present invention seeks to decode the digital data derived from the scan in the manner previously discussed. When operating in the "learning mode" or in the "real-time adaptive mode," the scanning system successively scans the predetermined location and attempts to decode the detected portion of the reflected light beam. By successively scanning and attempting to decode a symbol at the predetermined location, the scanning system develops percent decode data, For example, a scanning system operating in a real-time adaptive mode might successively scan and attempt to decode a symbol ten times. Multiple decoding attempts occur fast enough to be user transparent. If, assuming a threshold of 70%, the scanning system successfully decodes 8 or more scans out of 10, then a positive decode indication is given to the user and the decoded data is accepted by the scanning system. However, if 3 or more attempts to decode successive scans are unsuccessful, then the scanning system adjusts the light beam pattern and again attempts to obtain 8 or more out of 10 successfully decoded scans.

A scanning system operating in a "learning mode", might successively scan and attempt to decode a symbol ten times. Again assuming a threshold of 70%, the scanning system will save a particular set of operating parameters once 8 or more scans have been successfully decoded.

(2) Edge Detection

U.S. application Ser. No. 862,471, filed Apr. 2, 1992 (hereafter the "Multi-bit Digitizer" application) which is commonly assigned to the assignee of the present invention and hereby incorporated by reference, describes a multi-bit digitizer for a barcode symbol scanning system. Whereas conventional digitizers only detect the presence of barcode symbol edges, the multi-bit digitizer detects the presence of an edge, and measures the strength of the detected edge. This additional information is passed to a decoder to facilitate multi-bit threshold processing by resident software routines. The edge strength signal is also presented to the microprocessor 10 as a feedback signal and used to determine an optimal, or at least an improved light beam pattern and/or laser spot focusing adjustment for reading a symbol.

Figure 17:
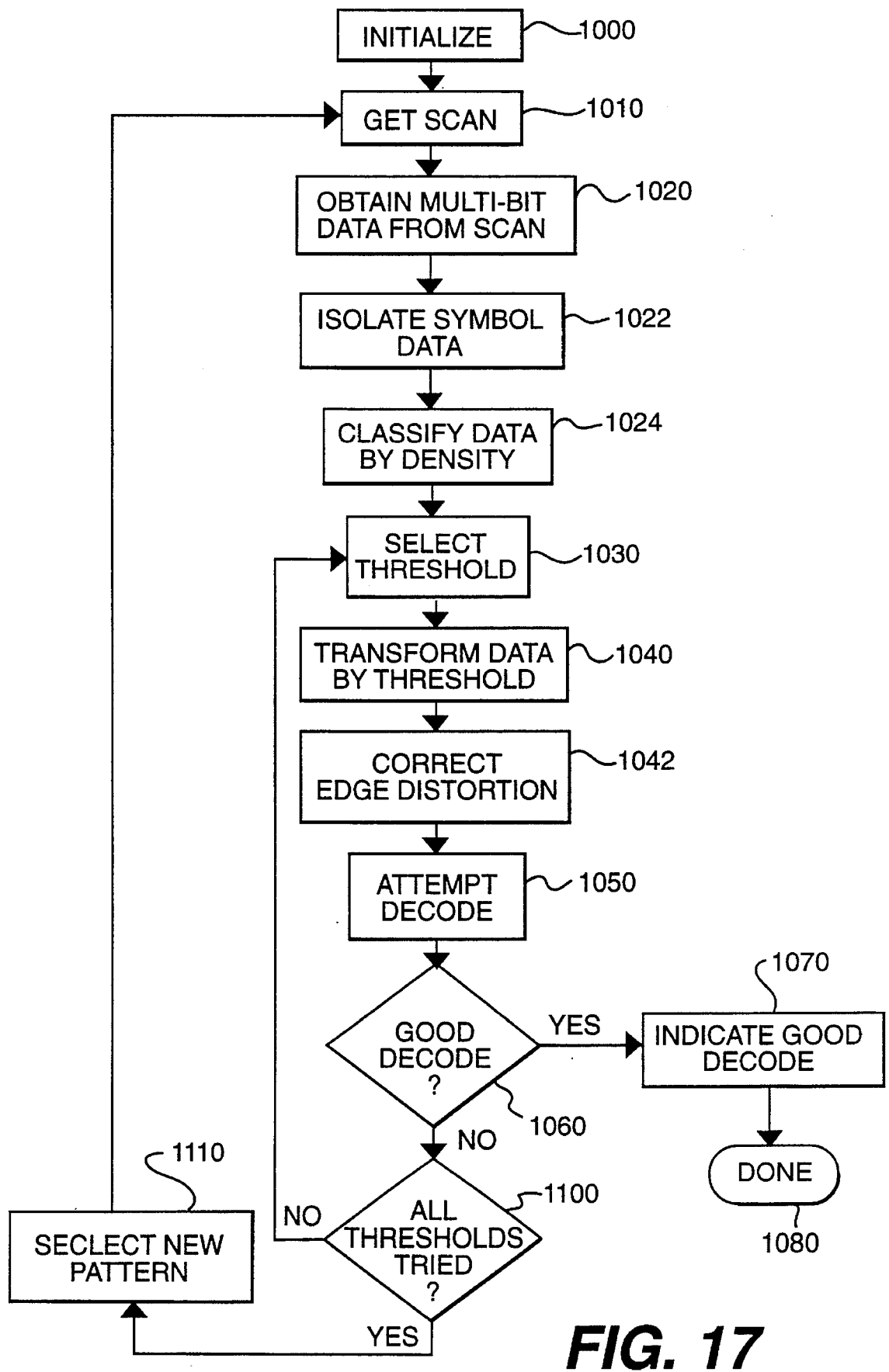
FIG. 17 is a flowchart illustrating the operation of a multi-bit digitizer in the scanning system of FIG. 1.

Operation of the multi-bit digitizer as a feedback signal source within an embodiment of the present invention is illustrated in diagrams shown in FIGS. 17 and 18. After initialization (1000), a scanning system obtains a scan (1010). Once a scan is obtained, an analog signal representative of the scan is produced and the positive and negative edges of the scan are detected. The strength of the detected edges and timing signals indicative of the relation are generated as multi-bit digital data (1020). Symbol data is isolated from the symbol margins and from other unwanted graphical text data (1022). Symbol density is classified based on the rise time and edge durations of a predetermined timing signal and the edge strength signed (1024). The timing signal and digital signals are applied to a decoder which performs multiple threshold processing on individual scans by processing each scan a multiple number of times at different detection threshold levels. Thus, for each scan a first predetermined threshold is selected (1030), and the multi-bit data is transformed using the threshold (1040). Before decoding is attempted (1050), edge distortion is corrected using the timing and edge strength signals of adjacent for wide and narrow elements. If decoding is successful (1060-yes), a positive indication is output to a user interface (1070) and the process is done (1080).

If, however, the first selected threshold is unsuccessful in decoding the scan (1060-no) a next predetermined threshold is selected (1100-no) and the process returns to step (1030). At some point where a number of predetermined thresholds have failed to successfully decode the scan, a determination is made that all thresholds have been tested. If so, (1100-yes) the scanning system will select a new light beam pattern (1110) and return to step (1010) to obtain a scan. The new light beam pattern selected in step (1110) may be selected on the basis of a preset series of light beam patterns, or on the basis of another feedback signal, for example, percent decode, barcode symbol position, etc.

FIG. 18 illustrates an alternative method wherein similarly labeled steps perform functions similar to those in FIG. 17. However, once a first threshold has been selected during initialization (1000) the method tests whether all light beam patterns have been tried for that threshold (1111). If all light beam patterns have not been tried the method continues to select new patterns (1110) so long as decoding is unsuccessful (1060-no). Once all of the predetermined light beam patterns have been tried, a second and subsequent thresholds are selected (1030).

(3) Barcode Symbol Position

U.S. patent application Ser. No. 07/851,493, filed Mar. 16, 1992, commonly assigned to the assignee of the present invention and hereby incorporated by reference, describes a method and apparatus for scanning and decoding a two-dimensional barcode symbol, such as PDF417, using a charge-coupled device (CCD) or a charge modulation device (CMD) camera. In the method and apparatus of this application, a CCD/CMD camera is used to obtain an image of a two-dimensional symbol. The image is converted to a digital data and then stored in memory. Once stored in memory, the image data can be repeatedly accessed to extract various spatial information regarding the symbol. In particular, the location and orientation of the symbol relative to a reference axis can be determined from the stored image data.

FIG. 19 illustrates a system for detecting the position of a two-dimensional barcode symbol such as PDF417 using a CCD/CMD camera. As shown in FIG. 19, a position detecting system 600 includes a decoder 614, a frame grabber circuit 616, and a two-dimensional CCD or CMD camera 618. CCD/CMD camera 618 takes a picture of a two-dimensional barcode symbol 50 and converts it to electrical signals. Typically, the output of the CCD/CMD camera is an analog signal representing the rows of the image being captured along with horizontal and vertical synchronization information.

Alternatively, if the two-dimensional symbol is moved past the camera, the CCD/CMD camera need only be a one-dimensional device. For example, the barcode symbol may be on an object moving past the camera on a conveyor belt, or may be printed on a document that is being moved in front of the camera. In such cases, the CCD/CMD camera can capture the image of the two-dimensional symbol by taking pictures of successive lines of the symbol as it moves past the camera.

Electrical signals from camera 618 are transmitted to frame grabber circuit 616 which converts the signals into a digital representation of the original image. The analog signals from the CCD/CMD camera are converted to eight-bit gray-level values and transmitted to decoder 614 where they are decoded into a matrix of codeword values corresponding to the rows and columns of the two-dimensional barcode symbol. As explained in further detail below, decoder 614 may be a separate logic unit or may be embodied in a subroutine operating on microprocessor 10. Assuming decoder 614 to be a separate element, position signals from decoder 614 are furnished as feedback signals to microprocessor 10 and used to derive pattern control signals.

FIG. 20 is a schematic block diagram of the hardware apparatus of decoder 614. As shown in FIG. 20, decoder 614 includes a FIFO (first in-first out) memory buffer 622 for receiving digital data representing the image of the two-dimensional barcode symbol from the frame grabber circuit 616. The FIFO buffer 622 temporarily holds the data as it is received from the frame grabber circuit 616 and then stores it in a memory 624. In order to do this, FIFO buffer 622 is connected to a central bus 623 to which the other hardware elements of the decoder are also connected. FIFO buffer 622 has direct memory access (DMA) capability which allows it to store the digital data directly in the memory for decoding. Alternatively, the frame grabber circuit 616 could be connected directly to the bus 623 with DMA capability and thereby store the digital data directly in the memory 624.

The decoder also includes a central processing unit (CPU) 625 and an interface (IF) 626 for communicating with the microprocessor 10. The CPU 625 is preferably a high-speed special purpose microprocessor such as the TMS 320 digital signal processor. The interface to the microprocessor 10 may be a standard interface such as an RS-232 interface.

Figure 25:
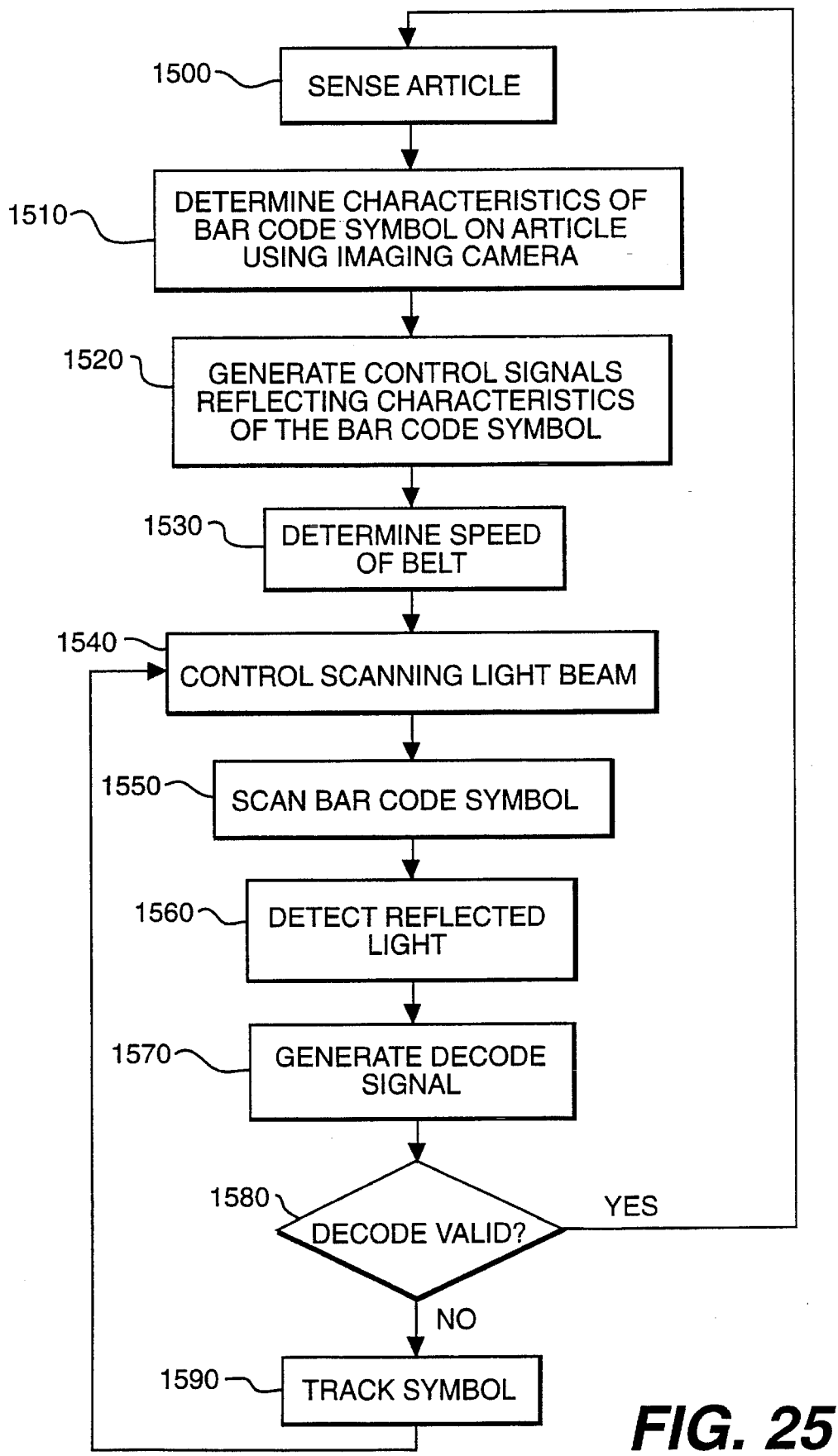
FIG. 25 is a flowchart illustrating the operation of the scanning system of FIG. 1 in a conveyor belt application.

Decoder circuit 614 is used to decode a two-dimensional barcode symbol such as PDF417, and to find the location and orientation of the symbol in the image data. Finding the location and orientation of the symbol is based on finding the start and stop patterns of the symbol in the image data. Operating on image data stored in memory, the decoder scans the data along a given row of the image as shown in FIG. 25. The data along the row is passed through an edge detector which determines the location of the edges in the data. The decoder then searches through the edge detection data looking for a sequence of eight elements that represent either a start or stop pattern.

The decoder starts at a first row of the image data, and subsequently scans the image data down a predetermined number of rows looking for start or stop patterns. The number of rows between successive scan lines may vary according to the particular environment or the resolution of the image data. For example, where the image data consists of 480 rows by 640 columns of pixel data, the decoder may be set to scan every twentieth row, skipping nineteen rows between successive scan lines.

Figure 21:
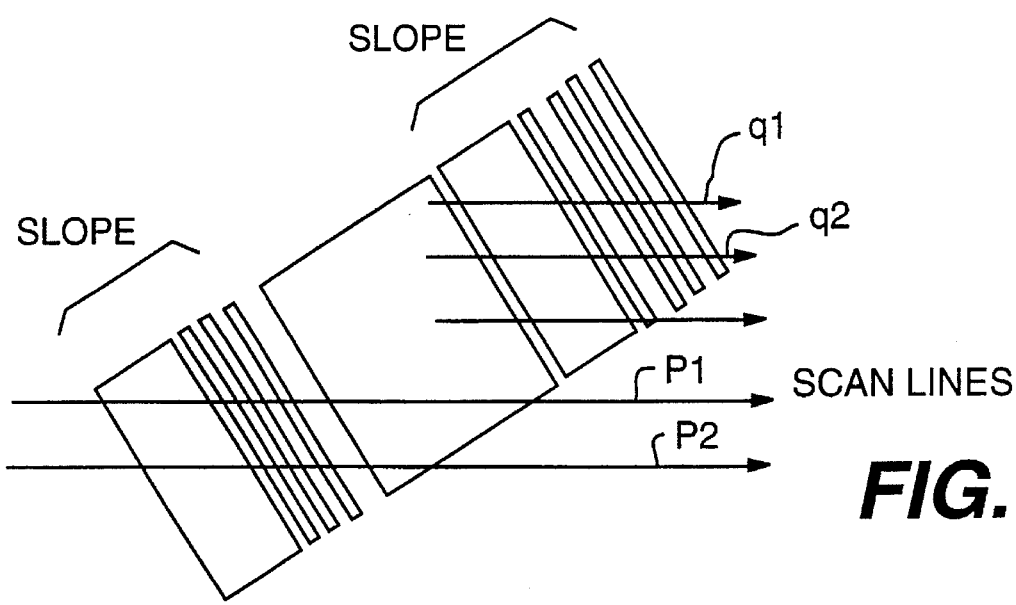
FIGS. 21–24 are diagrams illustrating the method by which the system of FIG. 19 determines the location and orientation of a barcode system.

If at least two start patterns or two stop patterns are found, then the orientation of the symbol can be determined. For example, as shown in FIG. 21, points p1 and p2 represent the locations of two start patterns, and points q1 and q2 represent the locations of two stop patterns. A straight line perpendicular to the rows of the symbol can be drawn through the two points as shown in FIG. 26 to determine the orientation of the symbol.

Although theoretically two such points are sufficient to determine a straight line, the decoder will try to accumulate more than two start or stop patterns, up to a predetermined limit. The decoder will then select the two "best" patterns for finding the orientation of the symbol. The best patterns are considered to be those start or stop patterns which have fewest defects and are as far apart as possible.

If the decoder is unable to detect two start patterns or two stop patterns in the foregoing manner, then the decoder will alter the scan looking for start or stop patterns in another direction, for example, a direction perpendicular to the present direction. If the decoder is still unable to detect at least two start patterns or two stop patterns, then the camera takes a new picture and the decoding process starts over.

Figure 23:
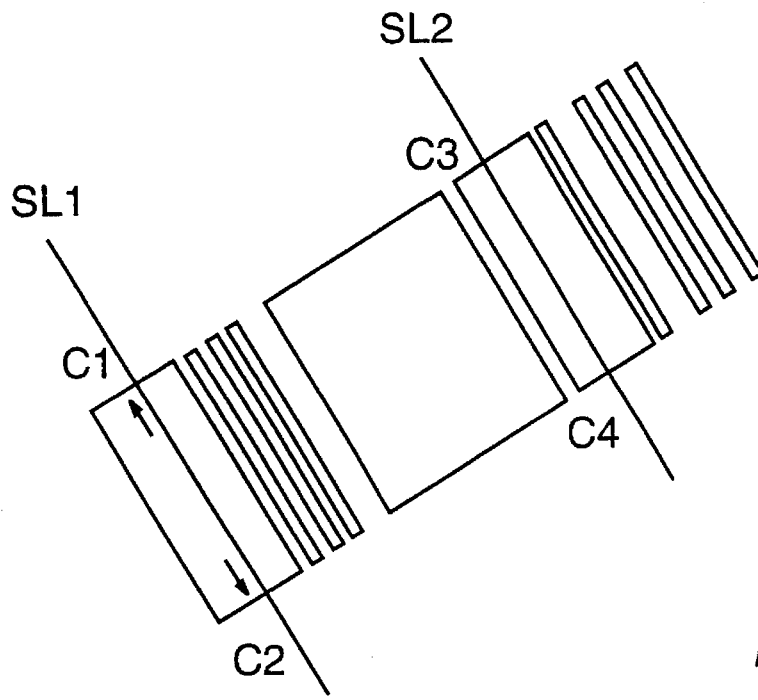

If the decoder is successful in detecting at least two start patterns and two stop patterns in the image data, the decoder then attempts to determine the location of four control points C1, C2, C3, and C4 at the top and bottom of the start and stop patterns as shown in FIG. 23. For the start pattern, this is done by first determining a straight line SL1 through the center of the first bar of the start pattern. Then starting from two points located inside the first bar, the decoder searches outward along the line SL1 for the edges of the symbol. The edges of the symbol are determined by a large change in the gray level of the pixel data along this line. The two edge points found in this way are the control points C1 and C2. A similar procedure is carried out for the stop code word along line SL2 to find the other two control points C3 and C4. Knowledge of control parts C1–C4 and/or straight lines SL1 and SL2 within a reference axis superimposed over CCD/CMD cameras field of view can be used to relate the symbol's position to the reference axis for the pattern/generator and rotator/translator.

Figure 22:
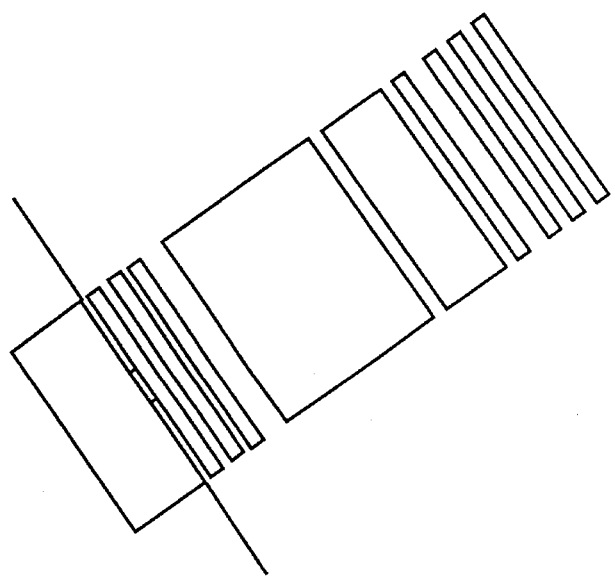

The edges of the symbol are determined by traversing a line between two points as in FIG. 22 and searching for an edge along the line. In particular, the slope of the line is first determined, and starting from the first end point of the line, the value or the gray level of a current pixel on the line is compared with the value of the previous pixel. If the compared value is greater than or equal to a predetermined threshold value, then the edge is at the current pixel position. If the compared value is less than the predetermined threshold value, then the current pixel position is incremented according to the slope of the line and the incremented position becomes the new current pixel position. The current pixel position (the incremented position) is compared with the last pixel position. This procedure is continued until either an edge is found, or the current pixel position reaches the last end point of the line.

Once the edges have been determined a stop pattern is searched for in the edge location data. To find the stop pattern, eight successive numbers are read. The first number, however, must be a bar. If it is not, then the next eight successive numbers are read. If the first number is a bar, then the first four numbers are determined. The eight numbers are normalized by dividing by the sum of eight values, multiplying by 17 and then rounding to the nearest decimal point of interest. The result is then compared to the start and stop patterns. If it matches one of those then the pattern is found. If any of the conditions are not met, then the next eight successive numbers are read.

Figure 24:
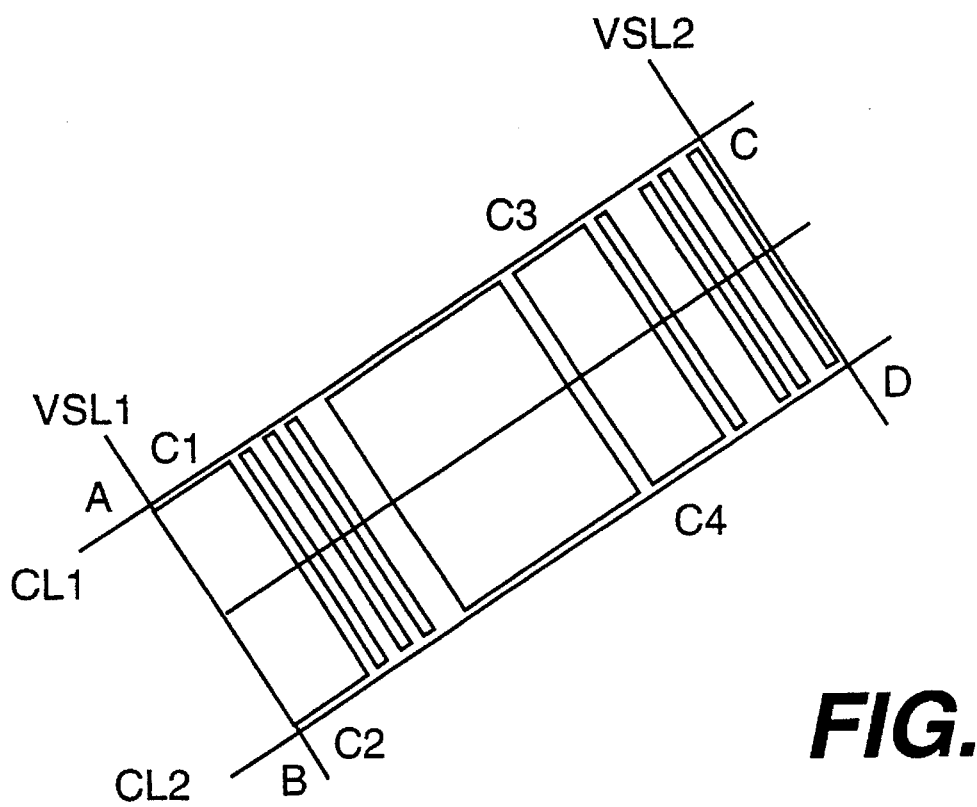

If multiple stop or start commands are found, then the two best start or stop patterns are selected. Based on the two best start and stop patterns selected, the four end points A, B, C, D shown in FIG. 24 are determined.

To determine the four end points, a line is drawn passing through the middle of the first bar of both start and stop patterns. An end point lies at a point having a large gray-level change on each line. Therefore, an end point exists along the lines VSL1, VSL2, CL1, and CL2 at the top and bottom of the last bar of the start pattern and at the top and bottom of the first bar of the stop pattern. Knowledge of end points A–D and/or lines VSL1, VSL2, CL1 and CL2 within a reference axis superimposed over the CCD/CMD cameras field of view can be used to relate the symbol's position to the reference axis for the pattern/generator and rotator/translator.

Having determined the location and orientation of the symbol, the present invention can derive pattern control signals (i.e., the displacement signal) in order to rotate and/or translate the light beam pattern to improve symbol readability. Additionally, the present invention may derive pattern control signals which cause the pattern generator to derive new coordinate control signals to alter the light beam pattern.

(4) External Control Signals

The present invention provides the capability to receive feedback signals from sources external to the scanning system. As an example, the method illustrated in the flowchart of FIG. 25 uses several external control signals in an application of the present invention to a conveyor belt system. The conveyor belt application assumes that the scanning system is fully or semi-automated, that is, that the scanning system self-adjusts to read symbols. Articles on the conveyor belt may have symbols at almost any readable orientation relative to the scanning system. Furthermore, one and/or two dimensional symbols may be used for each article.

In FIG. 25, the scanning system waits until an article is sensed by a proximity sensor at a predetermined location before beginning to scan for a symbol (1500).

The scanning system then uses an imaging camera to determine an orientation of a bar code symbol on the article (1510). The imaging camera system generates coordinate location signals reflecting a location, orientation and size of the bar code symbol (1520). The imaging camera system is shown in FIGS. 19 and 20. This system outputs control signals indicating characteristics of the bar code symbol to a scanner such as that showing in FIG. 1. A speed of the article is determined for tracking the article (1530) A light beam pattern is selected in the scanner in response to the control signals (1540). A light beam is directed in the selected pattern at the bar code symbol location in order to scan the bar code symbol (1550). The light reflected from the bar code symbol is detected (1560). A decode signal is generated corresponding to the detected reflected light (1570). If the decode signal is valid, the system awaits the next article (1580). If the decode signal is not valid the symbol on the article is tracked (1590) and successive attempts are made to decode the bar code symbol. The further attempts to decode may include changing the light beam pattern or changing an intensity or focus of the light beam pattern. This method allows for a moving symbol to be tracked and decoded.

FIG. 26 shows an article sensor 3100 for sensing a moving article 3010 and for sending a signal to the CCD/CMD system 618 indicating an article was sensed.

FIG. 27 shows a speed sensor 3000 that senses the speed of the article 3010 and outputs a signal indicating the article speed to the microprocessor 10 in the scanner.

H. SOFTWARE IMPLEMENTATION

As previously mentioned, it is expected that various operational parameters of the present invention will be defined in software to adapt the scanning system for use in a range of specific applications. For example, the data rate of information transfer, or other interface parameters, as well as the types of symbologies to be decoded, are Frequently determined by the user or by the scanning system manufacturer. However, specific scanning system models configured in accordance with the present invention will be operable with a larger variety of applications relative to conventional systems.

Sometimes it is also desirable to adjust or modify the electrical parameters or functions of the scanning system hardware to enable the system to perform in highly specialized applications better. To optimize the performance of a scanning system, such parameters as motor speed, amplifier gain, laser power amplifier bandwidth and digitizer thresholds may be adjusted and set at the time of manufacture or in accordance with previously incorporated U.S. Pat. Nos. 4,933,538, 4,808,804 and/or U.S. patent application Ser. No. 897,835 filed Jun. 12, 1992.

Unlike conventional systems, the present invention provides adjustable circuitry such that the adjustments mentioned above, and perhaps others, can be made under the control of a microprocessor. The same microprocessor used to decode symbols and/or interface with external equipment is preferably used for such adjustment operations, although a separate microcontroller may be employed. Such adjustments may be made during the manufacturing process to produce different scanning systems models having a predetermined range of operating parameters dedicated to the customer's use. Such adjustments may also be implemented by the customer at the time of installation, or at the beginning of a particular job. Such adjustments can also be made by the scanner automatically when placed in a "real-time adaptive" mode previously described.

The microprocessor can make various adjustments of optical and electrical parameters depending upon the accuracy and resolution needed. Examples of circuits that can be implemented in order to enable the microprocessor to make these adjustments are digital to analog convertors, digital and analog multipliers, digital potentiometers, analog switches, FETs and transistors.

K. CONCLUSION

The present invention provides a scanning system capable of adaptively altering the focus, output power, and pattern of a light beam directed at a barcode symbol. By so doing the scanning system provides a method and apparatus for tracking, scanning and decoding a barcode symbol attached to a moving object. The scanning system allows efficient alternative scanning of one- and two-dimensional barcode symbols. As a result, the scanning system offers improved barcode readability and user friendliness in a range of applications, including hand-held and fixed applications. The present invention also provides a scanning system having a multi-bit or single-bit digitizer capable of accurately defining a pulse-width modulated digital data signal corresponding to the spatial relationship of a scanned symbol even in noisy electrical environments.

It will be apparent to those skilled in the art that various modifications and variations can be made in the scanning system method and apparatus without departing form the scope or spirit on the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of scanning bar code symbols on articles moving at a given speed, comprising the steps of:

sensing an article at a predetermined location;

determining a location of a bar code symbol on the article using an imaging camera;

generating coordinate location signals reflecting the determined location of the bar code symbol;

controlling a scanning light beam in response to the coordinate location signals;

scanning the bar code signal by directing the scanning light beam at the bar code symbol location;

detecting a reflected portion of the scanning light beam;

generating a decode signal corresponding to the reflected light beam portion;

determining whether the decode signal represents a valid decode; and rescanning the bar code symbol when the decode signal is not a valid decode.

2. The method of scanning bar code symbols as in claim 1, further including the step of:

adjusting a pattern of the scanning light beam before rescanning the bar code symbol.

3. The method of scanning bar code symbols as in claim 1, wherein the step of rescanning further includes the steps of:

determining a speed of a moving belt that supports an article moving proximate the predetermined location; and tracking the bar code symbol before rescanning the bar code symbol.

4. The method of scanning bar code symbols as in claim 1, wherein the scanning step is performed by a flying spot scanner.

5. The method of scanning bar code symbols as in claim 1, wherein the step of generating coordinate location signals further includes the step of generating coordinate orientation signals reflecting an orientation of the bar code symbol, and wherein the step of controlling the scanning light beam includes the step of controlling the scanning light beam in response to the coordinate orientation signal and the coordinate location signal.

6. The method of scanning bar code symbols as in claim 1, wherein the step of generating coordinate location signals further includes the step of generating a size signal reflecting a size of the bar code symbol, and wherein the step of controlling the scanning light beam includes the step of controlling the scanning light beam in response to the size signal and the coordinate location signal.

7. A system for scanning bar code symbols on articles moving at a given speed comprising:

means for sensing the presence of an article at a predetermined location;

means for recording an image of the article;

means for examining the recorded image to determine a location of a bar code symbol on the article;

means for generating coordinate location signals reflecting the location of the bar code symbol;

means for controlling a scanning light beam in response to the coordinate location signals;

means for scanning the bar code symbol using the scanning light beam;

means for detecting a reflected portion of the scanning light beam;

means for generating a decode signal corresponding to the reflected light beam portion;

means for determining whether the decode signal represents a valid decode; and means for rescanning the bar code symbol when the decode signal is not a valid decode.

8. The system for scanning bar code symbols as in claim 7, further including means for adjusting a pattern of the scanning light beam before rescanning the bar code symbol.

9. The system for scanning bar code symbols as in claim 7, further including means for determining a speed of a moving belt that supports an article moving proximate the predetermined location; and means for tracking, based upon the determined speed of the article, the bar code symbol before rescanning the bar code symbol.

10. The system for scanning bar code symbols as in claim 7, wherein the scanning means includes a flying spot scanner.

11. The system for scanning bar code symbols as in claim 7, wherein the means for generating coordinate location signals further includes means for generating coordinate orientation signals reflecting an orientation of the bar code symbol, and wherein the means for controlling the scanning light beam includes means for controlling the scanning light beam in response to the coordinate orientation signal and the coordinate location signal.

12. The system for scanning bar code symbols as in claim 7, wherein the means for generating coordinate location signals further includes means for generating a size signal reflecting a size of the bar code symbol, and wherein the means for controlling the scanning light beam includes means for controlling the scanning light beam in response to the size signal and the coordinate location signal.

13. The system for scanning bar code symbols as in claim 7, wherein the picture taking means includes a charge coupled device (CCD) camera.

14. The system for scanning bar code symbols as in claim 7, wherein the picture taking means includes a charge modulation device (CMD) camera.

15. A system for scanning bar code symbols on moving articles comprising:

a sensor for sensing the presence of an article at a predetermined location;

an imaging camera for recording an image of the article;

an image processor for examining the recorded image to determine a location of a bar code symbol on the article and for outputting coordinate location signals reflecting the location of the bar code symbol;

a microprocessor for controlling a scanning light beam in response to the coordinate location signals;

a scanner for scanning the bar code signal using the scanning light beam and for detecting a reflected portion of the scanning light beam;

a decoder for generating a decode signal corresponding to the reflected light beam portion; and wherein the microprocessor determines whether the decode signal represents a valid decode and initiates a rescan of the bar code symbol when the decode signal is not a valid decode.

16. The system for scanning bar code symbols as in claim 15, further including pattern generator means for adjusting a pattern of the scanning light beam before rescanning the bar code symbol.

17. The system for scanning bar code symbols as in claim 15, further including a speed sensor for determining a speed of a moving belt that supports an article moving proximate the predetermined location, and wherein the microprocessor includes means for tracking the bar code symbol before rescanning the bar code symbol based on the speed of the belt and the coordinate location signal.

18. The system for scanning bar code symbols as in claim 15, wherein the scanner is a flying spot scanner.

19. The system for scanning bar code symbols as in claim 15, wherein the image decoder generates coordinate orientation signals reflecting an orientation of the bar code symbol, and wherein the microprocessor selects the pattern of the scanning light beam based upon the coordinate orientation and the location signals.

20. The system for scanning bar code symbols as in claim 15, wherein the imaging camera generates a size signal reflecting a size of the bar code symbol, and wherein the microprocessor selects the pattern of the scanning light beam based on the size signal and the coordinate location signal.

21. The system for scanning bar code symbols as in claim 15, wherein the imaging camera is a charge coupled device (CCD) camera.

22. The system for scanning bar code symbols as in claim 15, wherein the imaging camera is a charge modulation device (CMD) camera.

* * * * *

UNITED STATES PATENT AND TRADEMARK OFFICE
CERTIFICATE OF CORRECTION

PATENT NO. : 5,525,788
DATED : June 11, 1996
INVENTOR(S) : Bridgelall et al.

It is certified that error appears in the above-indentified patent and that said Letters Patent is hereby corrected as shown below:

<u>CLAIM 19</u>, COL. 22, L. 65, CHANGE "decoder generates" TO --processor includes means for generating--;

COL. 23, L. 1, CHANGE "selects the pattern of" TO --includes means for controlling--; and COL. 23, L. 3, AFTER "tation" INSERT --signal-- AND CHANGE "location signals" TO --coordinate location signal--.

<u>CLAIM 20</u>, COL. 23, L. 5, CHANGE "generates" TO --includes means for generating to--; and COL. 23, L. 7, CHANGE "selects the pattern of" TO --includes means for controlling--.

Signed and Sealed this

Twenty-ninth Day of October 1996

Attest:

BRUCE LEHMAN

*Attesting Officer*   *Commissioner of Patents and Trademarks*